April 5, 1966 W. G. MITCHELL 3,244,031
POWER TOOL IMPROVEMENTS
Filed Oct. 31, 1961 16 Sheets-Sheet 6
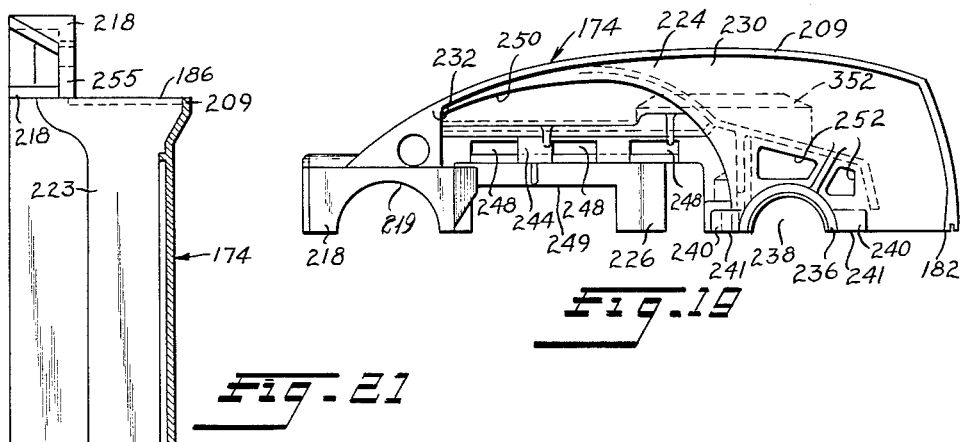
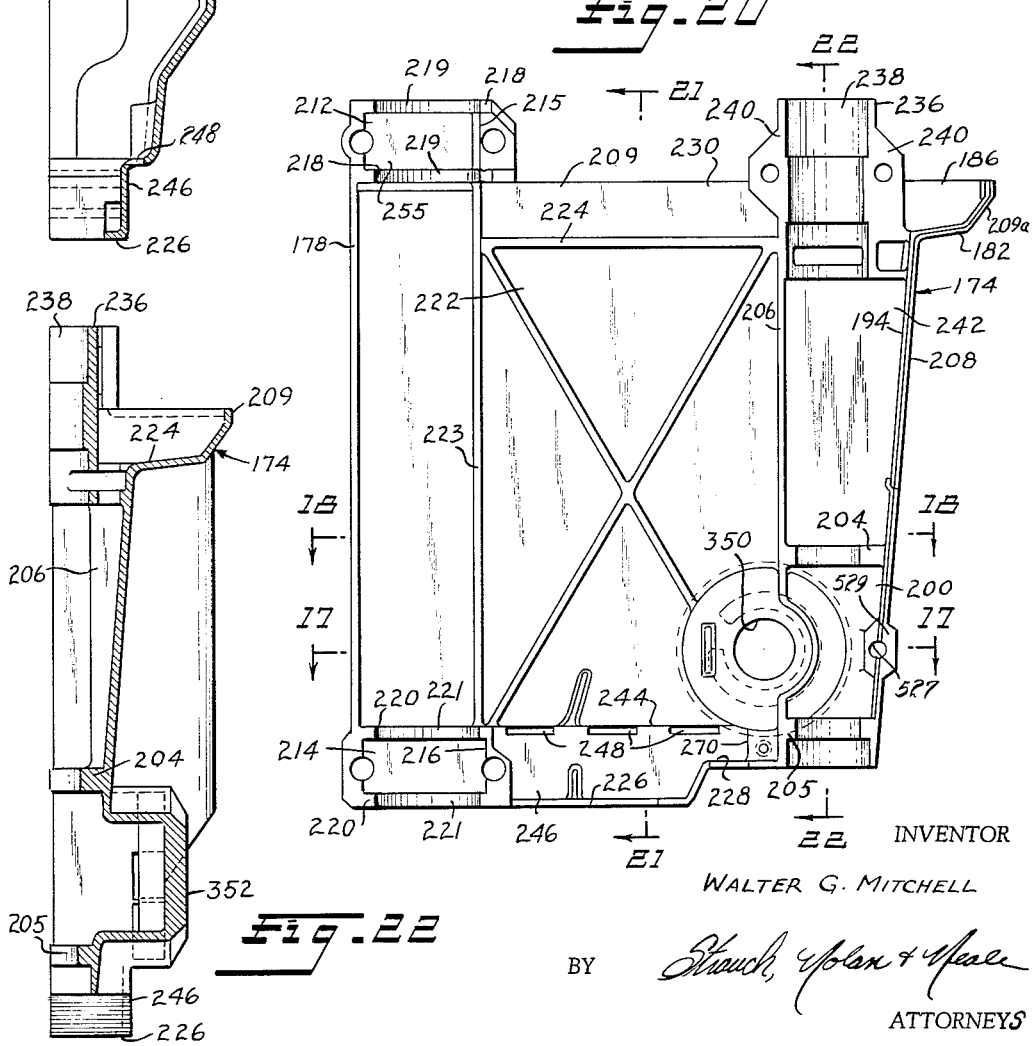
INVENTOR
WALTER G. MITCHELL
BY Strauch, Nolan & Neale
ATTORNEYS April 5, 1966 W. G. MITCHELL 3,244,031
POWER TOOL IMPROVEMENTS
Filed Oct. 31, 1961 16 Sheets-Sheet 7
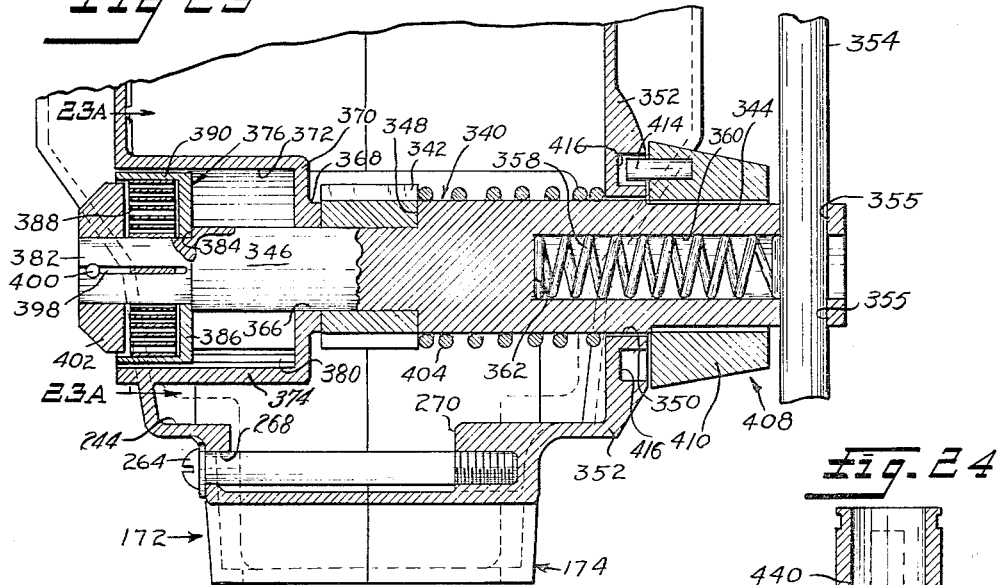
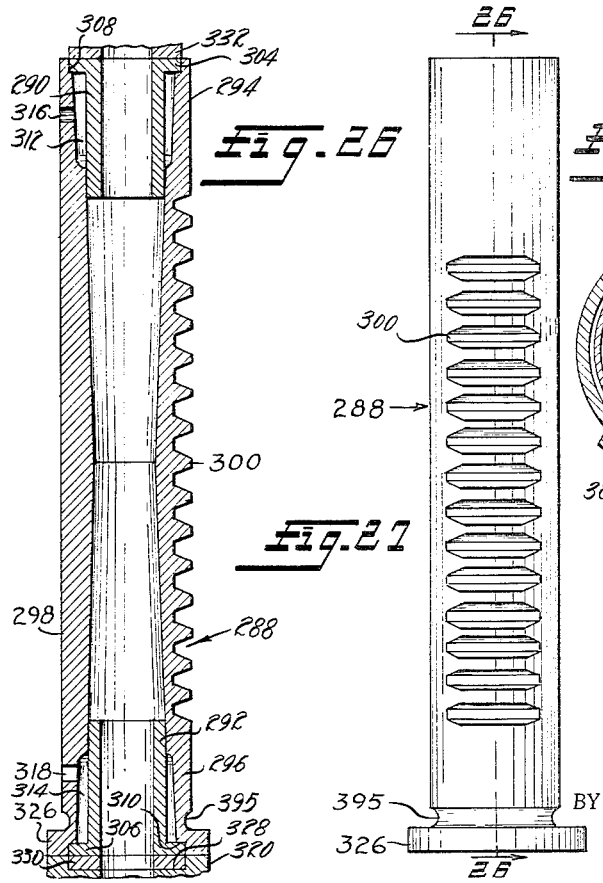
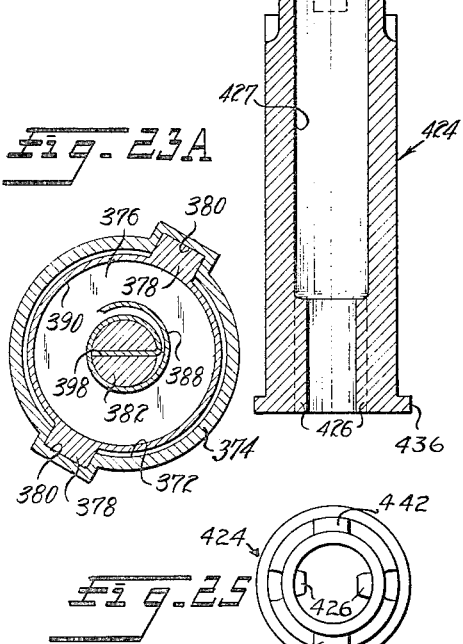
INVENTOR
WALTER G. MITCHELL
BY
ATTORNEYS INVENTOR
Walter G. Mitchell April 5, 1966 W. G. MITCHELL 3,244,031
POWER TOOL IMPROVEMENTS
Filed Oct. 31, 1961 16 Sheets-Sheet 10

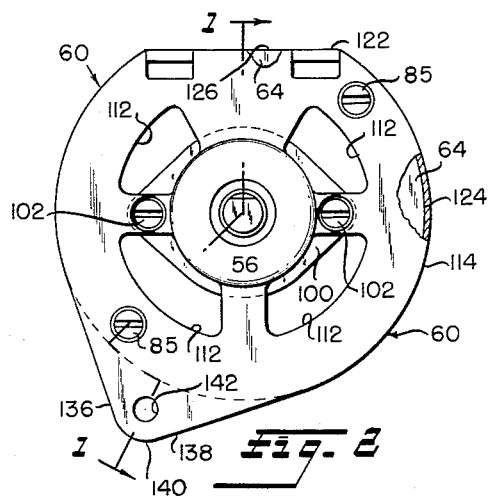

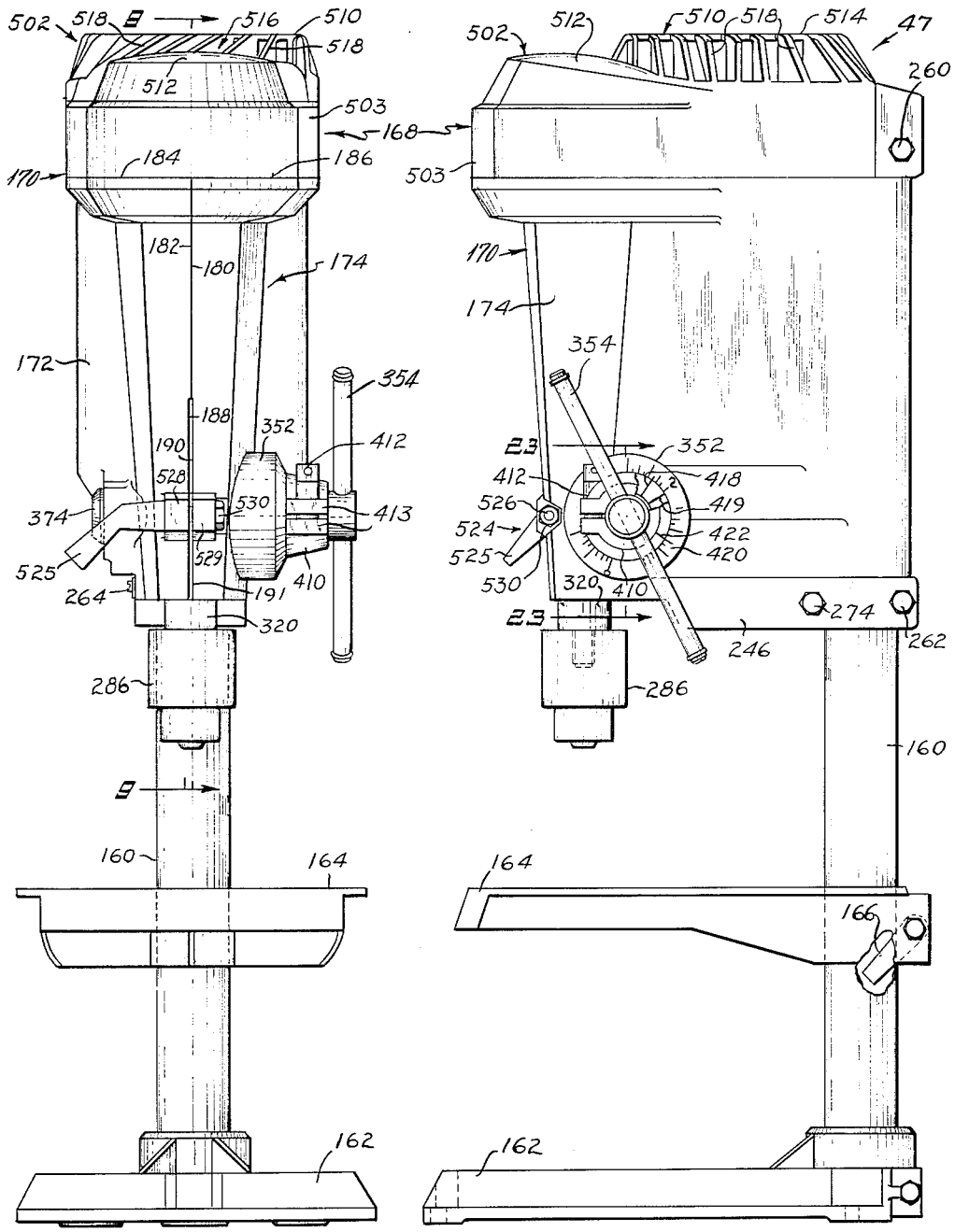

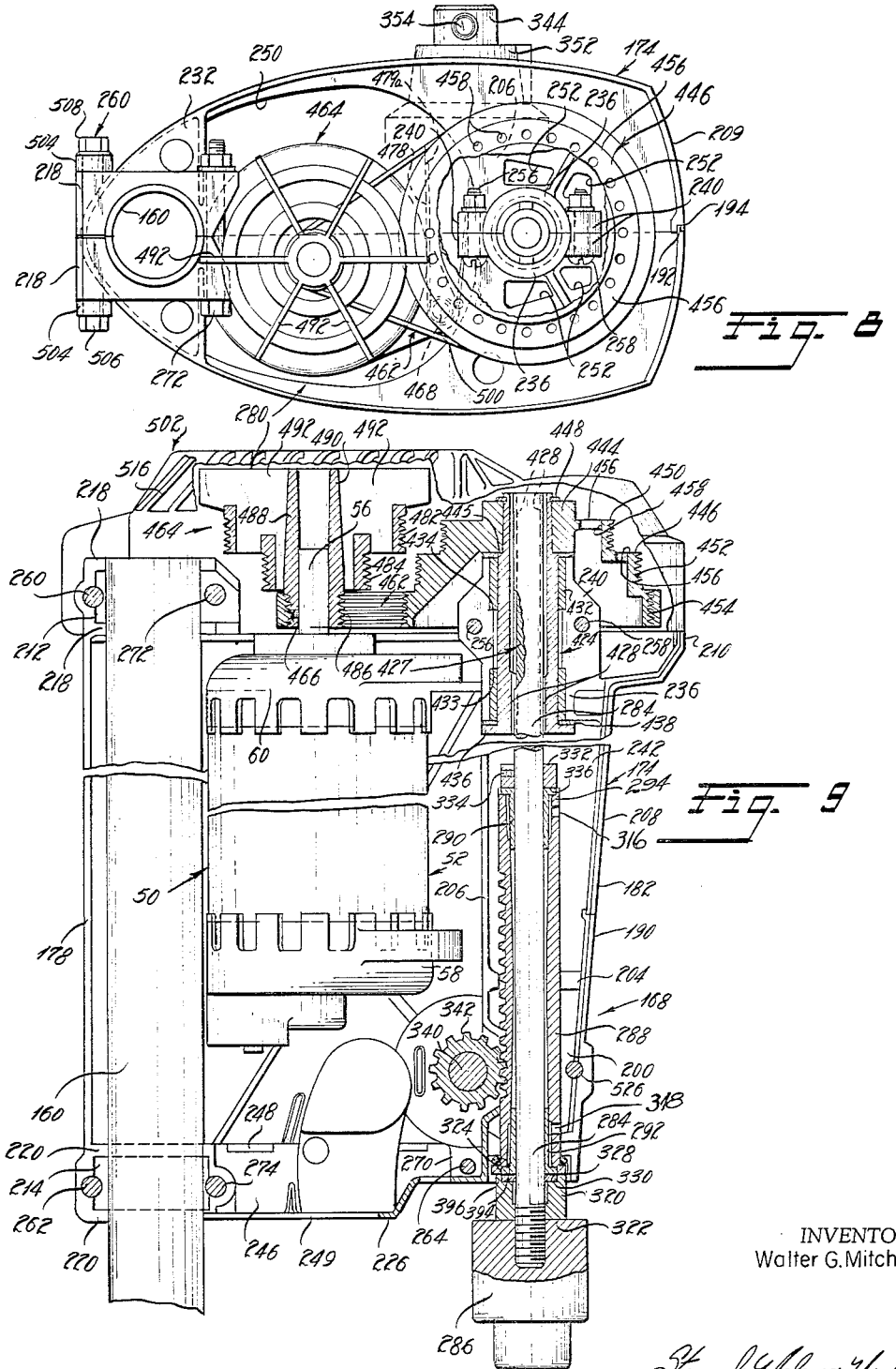

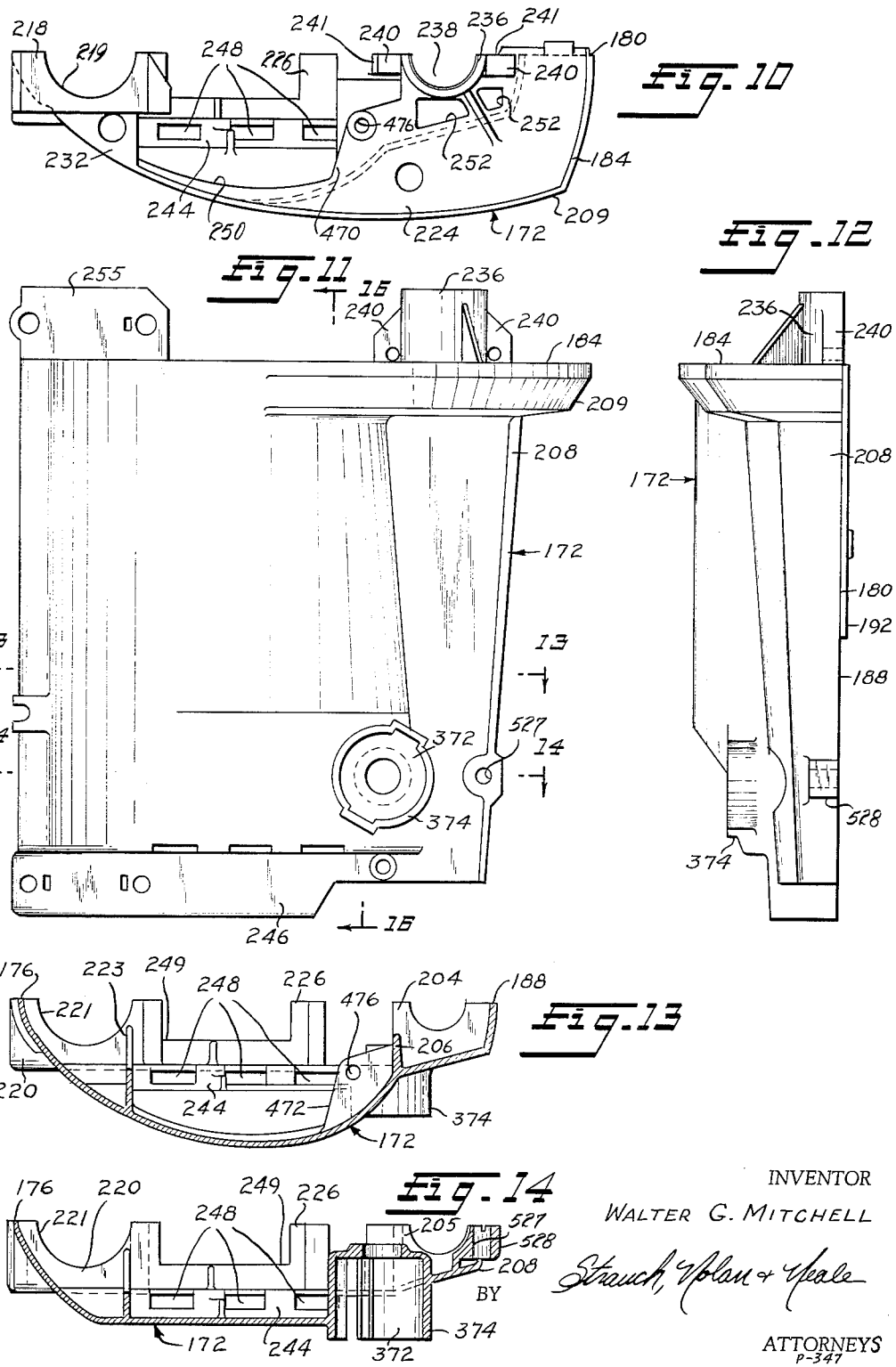

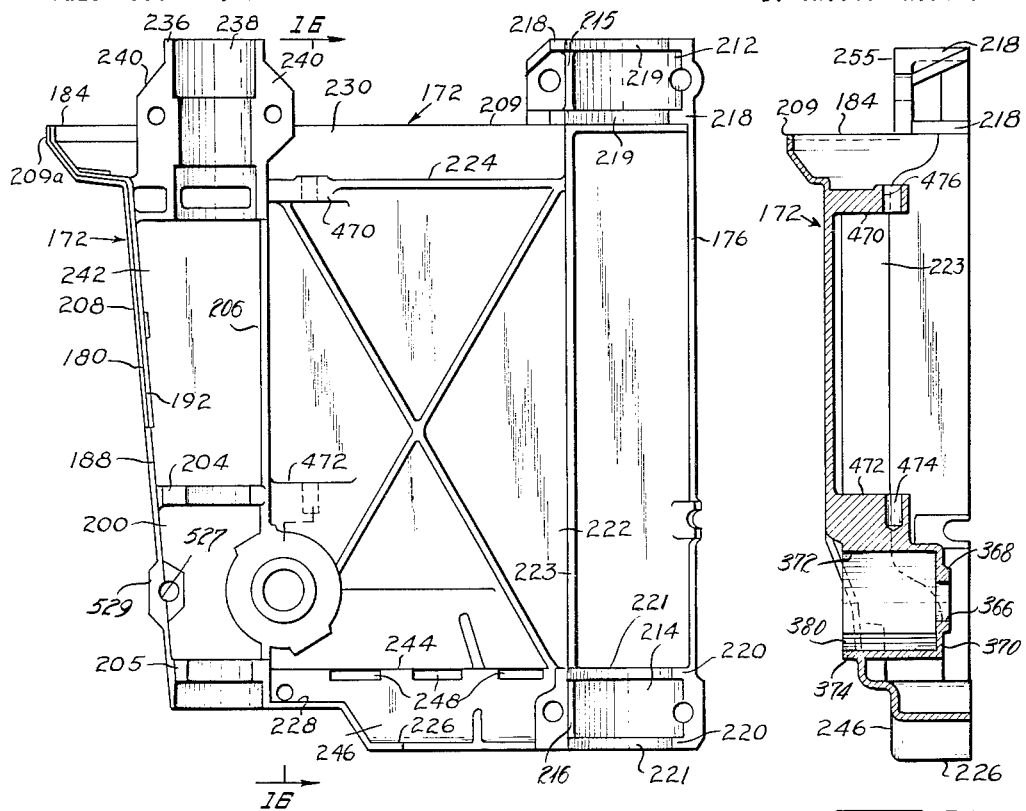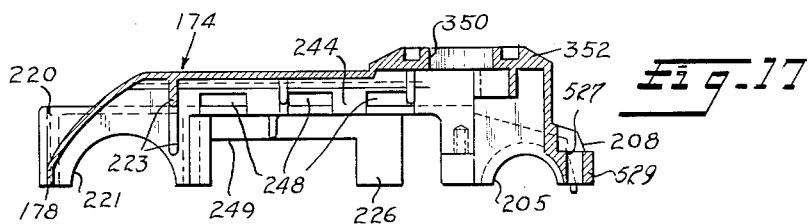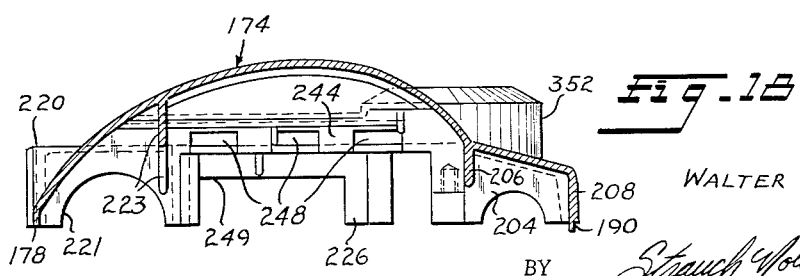

INVENTOR
Walter G. Mitchell

BY Strauch, Nolan & Yeale
ATTORNEYS

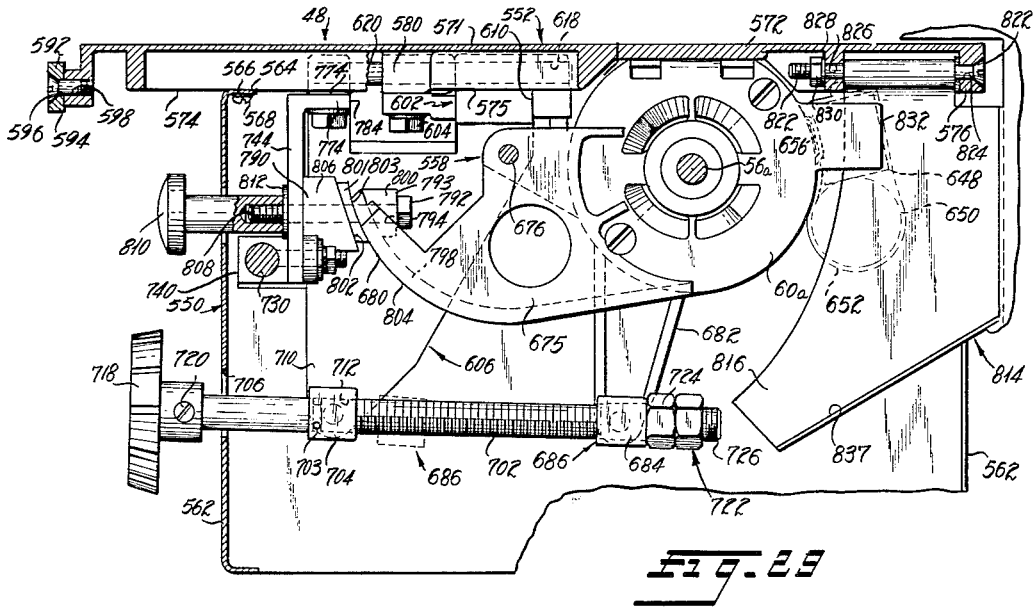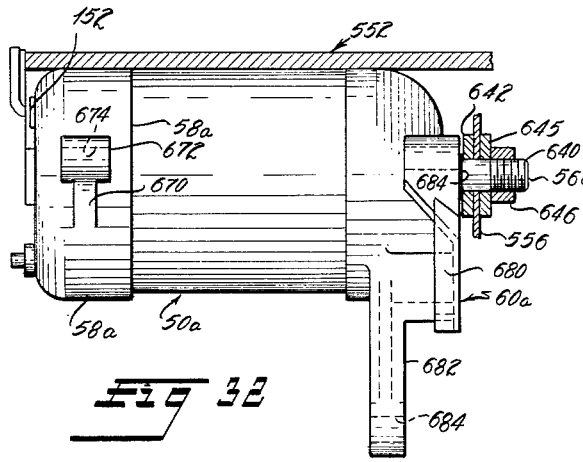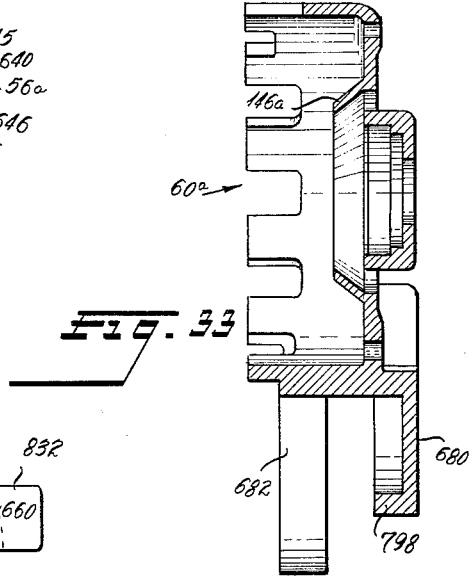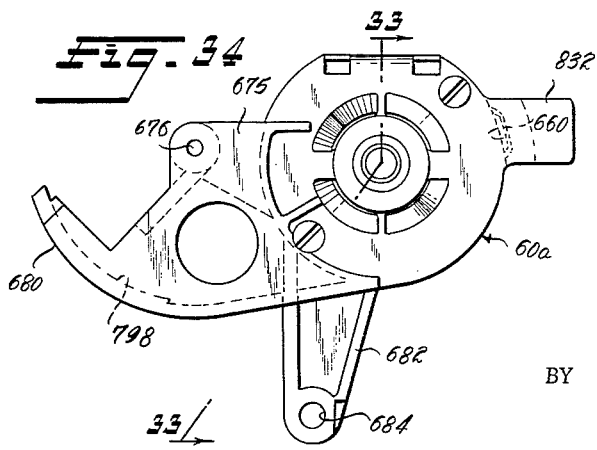

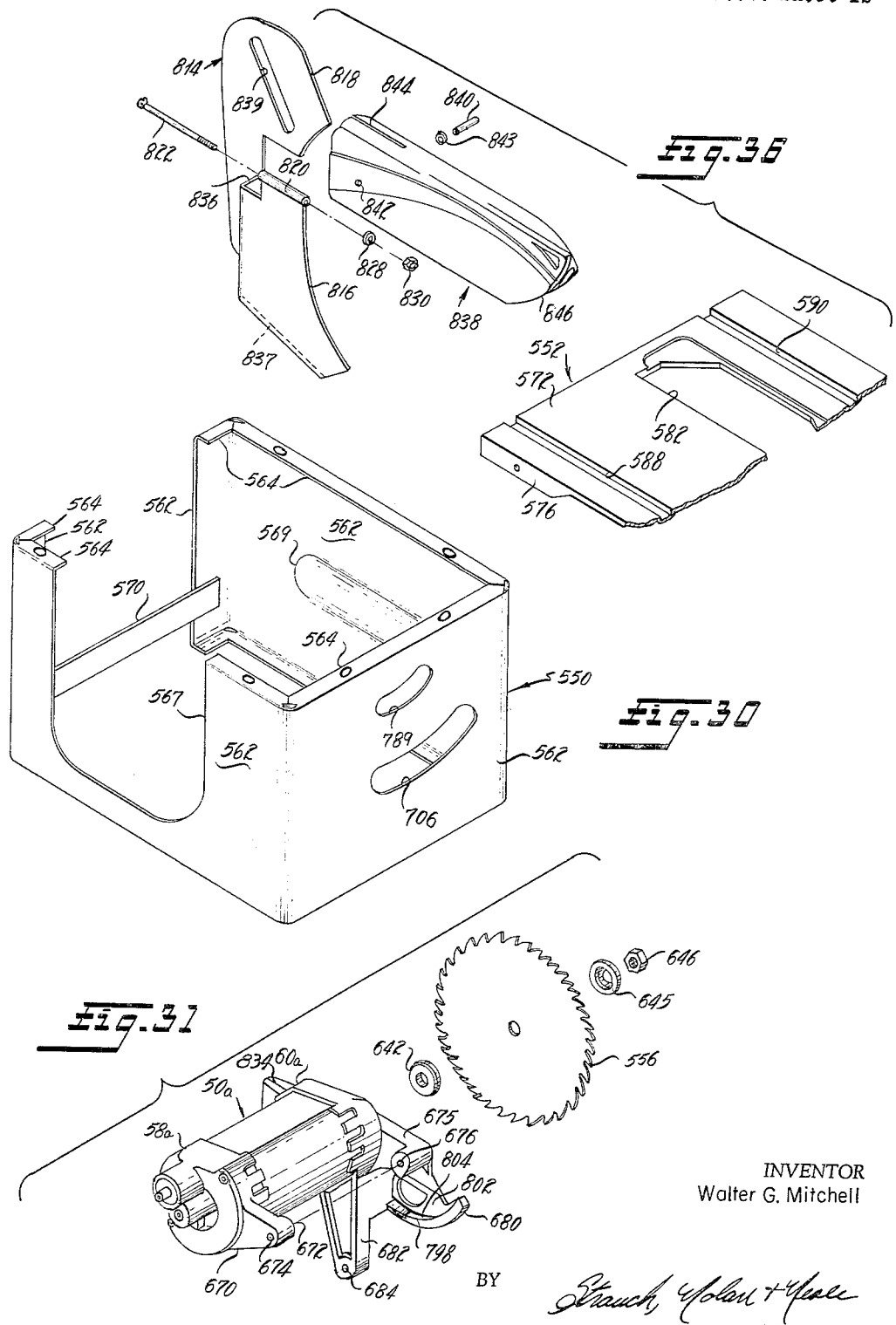

April 5, 1966 W. G. MITCHELL 3,244,031
POWER TOOL IMPROVEMENTS
Filed Oct. 31, 1961 16 Sheets-Sheet 13
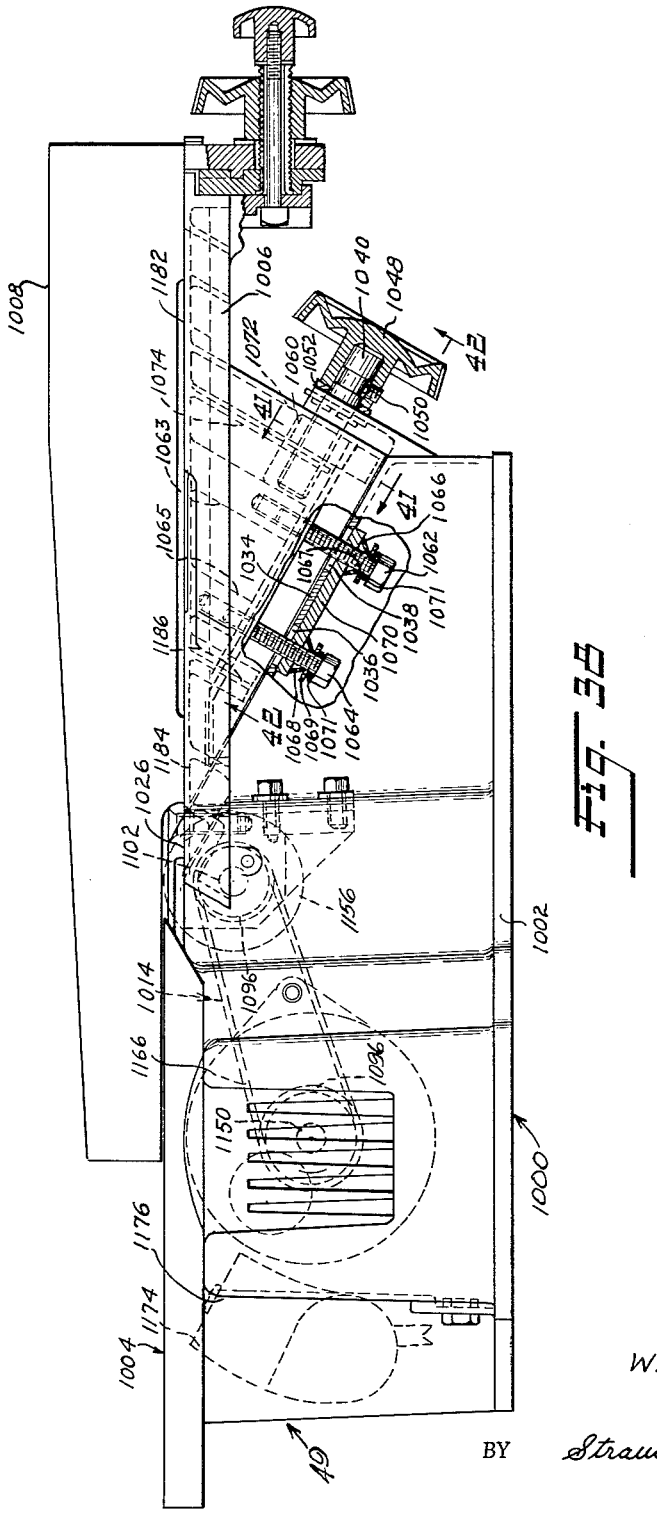
INVENTOR
WALTER G. MITCHELL
BY Strauch, Nolan & Neale
ATTORNEY April 5, 1966 W. G. MITCHELL 3,244,031
POWER TOOL IMPROVEMENTS
Filed Oct. 31, 1961 16 Sheets-Sheet 14

INVENTOR
WALTER G. MITCHELL
Strauch, Nolan & Neale
ATTORNEYS

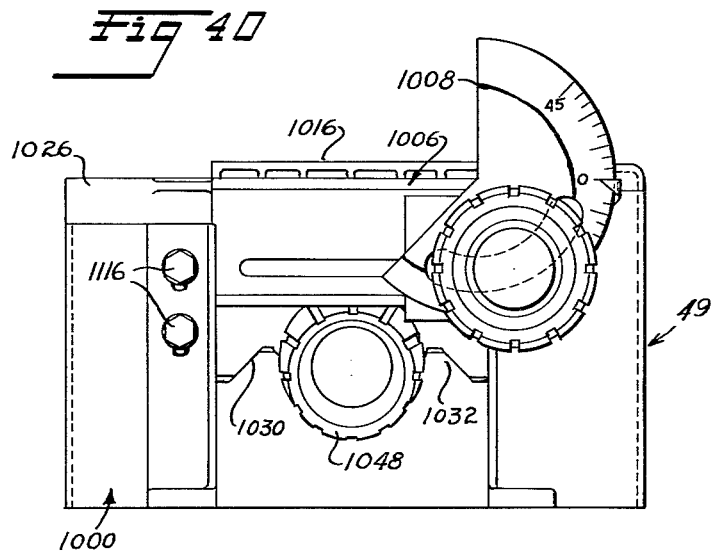
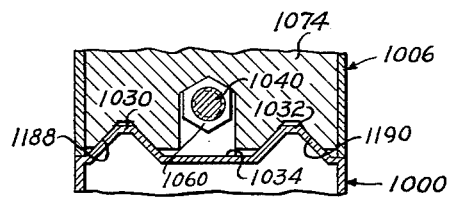
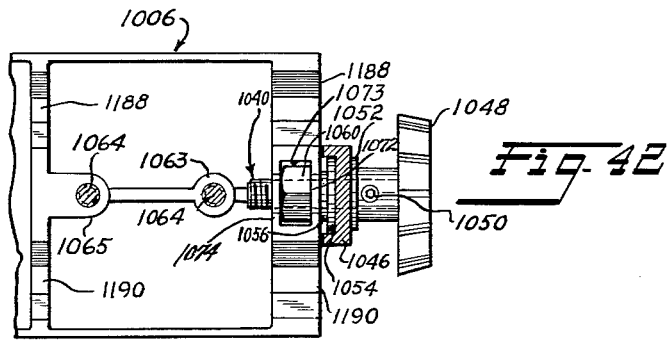

April 5, 1966  W. G. MITCHELL  3,244,031
POWER TOOL IMPROVEMENTS
Filed Oct. 31, 1961  16 Sheets-Sheet 16

INVENTOR
WALTER G. MITCHELL

BY Strauch, Nolan & Neale
ATTORNEYS

3,244,031
POWER TOOL IMPROVEMENTS
Walter G. Mitchell, Pitcairn, Pa., assignor to Rockwell Manufacturing Company, Pittsburgh, Pa., a corporation of Pennsylvania
Filed Oct. 31, 1961, Ser. No. 149,002
13 Claims. (Cl. 77—19)

The present invention relates to power tool improvements and more particularly to improvements in bench or table supported power tools which make it possible to reduce the size and weight of such power tools and their parts with incident simplification of the overall construction of such tools and marked savings in materials and manufacturing expense while at the same time assuring at least the same or greater work handling capacity of the larger and heavier power tools now generally offered on the market.

As will be apparent from a consideration of typical power tool structures illustrated in United States Letters Patent 2,346,198 of Herbert E. Tautz issued April 1, 1944, 2,360,921 of C. A. Wiken issued October 24, 1944, 2,567,987 of C. A. Wiken issued September 18, 1951 all directed to drill press structures; further consideration of United States Letters Patent 2,265,406 and 2,265,407 of Herbert E. Tautz issued December 9, 1941 both directed to circular saw structures; and still further consideration of United States Letters Patent 2,758,617 of W. S. Taylor issued April 14, 1946 and entitled "Jointer," it has been the general commercial practice in the power tool art to provide power tools with heavy standard encased motors and to utilize cast iron or other heavy support structure and work table structures requiring expensive machining operations to provide the necessary accuracy for journals, pads, lands and slide ways needed for the mounting of the motors, cutter arbors and control mechanism. As a consequence, the prior art bench and table tools embody massive metal support and work table structures to house and support the large heavy motors and necessitate an inordinate amount of machining, out sized cutter structures of highly expensive tool steel, special high cost bearings and expensive special lubrication because of the resulting motor, arbor bearing and cutter heat.

It is a primary object of this invention to avoid the massive structures of the prior art and overcome the heat dissipation problems by providing power tool structures employing a casingless motor and combination motor and operating mechanism housings, support parts and shafting and other mechanism parts made up of die castings of high heat conducting material designed to cooperate with the housingless motor structure and die cast high heat conductive motor rotor and fan structure and end bells to dissipate the motor, arbor bearing and cutter heat and eliminate major machining operations thereby assuring greatly reduced tool sizes, major savings of table and housing material and an over-all reduction of manufacturing, packaging and shipping expense. To accomplish this size reduction and weight and material saving while providing a motor having adequate horsepower to enable the resulting machine tools to assure the same workpiece handling capacity poses a major problem in heat dissipation as the art has long appreciated, see United States Letters Patent 1,977,061 to J. G. Hey issued October 16, 1934 and 2,700,115 of J. R. Mowery, Jr. issued January 18, 1955 which are novelly met in this invention by utilizing light weight, high heat conductive metal parts and designing the control mechanisms and support elements to relieve them of abnormal strains in use that might fracture such parts.

It is a further important object of this invention to provide a belt driven power tool having a motor pivot mount defining a pivot axis paralleling the axis of the motor shaft and driven shaft and lying in an area delimited by a pair of intersecting planes one of which contains the axes of the motor shaft and the driven shaft and the other of which contains the path of travel of the outer face of the tension side or the driving run of an endless drive belt passing around a motor shaft mounted drive pulley and a driven pulley mounted on the driven shaft thereby assuring a nonslipping belt drive capable of delivering the full motor torque to the tool cutter arbor and eliminating the need of extraneous belt tightening expedients that might impose undesirable stresses on support parts at points difficult to design with sufficient strength.

Another important object of the present invention is to provide a casingless electric motor having die cast end bells providing accurately related motor shaft bearing seats and pivot mounts in the form of stout strain and stress resisting pivot arms.

A still further object of the present invention is to provide a drill press head structure comprising a pair of die cast metal housing halves formed with the required reinforcing ribbing, bearing seats, shaft passages, motor mounts, and ventilation passages and designed with a unique cover structure to house and adequately dissipate the heat generated by the motor and the operating mechanism in use.

A further object of the present invention is to provide a drill press head structure in accord with the previous object with die cast quill, and vented pulley elements to reduce the overall weight and assure rapid dissipation of the generated heat so that machining expense may be minimized and inexpensive sleeve bearings may be used in the place of more expensive roller or like bearing elements without prejudicial effect on the accuracy or life of the machine tool.

Another object of the present invention is to provide a drill press quill feed mechanism of the spring return type that is simple and inexpensive to manufacture yet designed to permit ready adjustment of the return spring tension without any need to release any part of the return spring mechanism from its enclosing housing or handling of parts that are difficult to grasp and might, therefore, injure the operator.

A further object of the present invention is to provide in combination with other elements of a drill press quill feed mechanism having an exposed feed shaft portion with a simple depth of cut stop and indicator that may be set at any desired portion of the feed stroke to directly accurately determine through scale indications a desired depth of penetration of a workpiece.

It is a further object of the present invention to provide a circular saw structure comprising a die cast metal work support table formed with the required reinforcing ribbing, miter gauge grooving, table blade opening and motor and operating mechanism bracket pads; a die cast tilt bracket and bracket support for supporting, aligning and mounting motor and operating parts, and die cast motor end bells directly mounting the motor on the tilt bracket to reduce the over-all weight and assure rapid dissipation of the generated heat so that expense may be minimized.

Another object of the present invention is to provide a circular saw structure in accord with the preceding object with a simple tilt bracket pivot mount located closely adjacent the undersurface of the table, a casingless motor in which the stator and motor end bells terminate along a chordal plane to form an axially continuous flat side from end to end of the motor at a minimum radial distance from the axis of the motor shaft and motor end bells having supporting pivot arms arranged with respect to the flat sides to assure abutment of the flat side with the table undersurface to assure a direct heat conduction path from the motor stator and end bells to the table itself and a minimal linear distance between the rotor and axis and work support surface of the table to expose a greater portion of that annular area of the saw blade nearest the rotational axis above the work support surface enabling a saw blade of reduced diameter to be employed to provide a more effective application of available motor power to the cutting teeth in handling given work capacity thereby saving saw blade material, and enabling a dimensional reduction of the table and support parts with incident material and machining savings.

Another object of the present invention is to provide a circular saw in which the operating mechanism support parts are made up of die cast, light weight, high heat conductive metal with hand wheel driven tilt screw and elevating screw mechanisms having limit stops designed to prevent the light weight parts from being overstressed by overtravel of such hand wheel driven screw mechanisms.

A still further object of the present invention is to provide a tilting arbor table saw with (a) a die cast tilt bracket of general L-shaped configuration having a main body portion formed along its top edge with spaced pivot ears for suspending the tilt bracket from a saw table pivot close to the saw table under surface and an end wall providing at a level offset below the pivot ears a pair of pivot support ears mounting a depth of cut pivot with its axis at right angles to the saw table pivot and (b) a motor having a combined rotor and saw blade arbor shaft and die cast end bells fixed to the stator and adapted to journal the combined rotor and saw blade arbor shaft and provide respective radially directed mounting arms terminating in pivot journal bosses for directly pivotally mounting the motor for swing movement toward and away from the table around the depth of cut pivot.

Still another object of the present invention is to provide one of the end bells of the preceding object with a web structure extending between the lower edge of its mounting arm and the end bell end wall and extending outwardly beyond the mounting arm to terminate in an arcuate flanged portion having the axis of the depth of cut pivot as a center and forming a clamp surface engageable by a clamp mechanism supported and oriented by an ear formed on the main body of the tilt bracket to clamp the motor in selected depth of cut positions.

Another object of the present invention is to provide the end bell of the previous object with a second arm angularly offset from its mounting arm and terminating in an apertured journal boss journalling a block having a through tapped opening to threadedly receive an elevator screw shaft threadedly supported by a similar block journalled in a journal bore suitably positioned on the main body of the tilt bracket.

Another object of the present invention resides in extending the clamp mechanism called for in a previous object axially beyond its supporting ear and through an arcuate slot formed in a further table supported bracket fixed to the table and extending at right angles adjacent the other end of the main body of the tilt bracket adapting it to also cooperate with the further table supported bracket and provide a clamp mechanism for clamping the tilt bracket in a selected position.

A further object of the present invention resides in providing a tilting arbor saw having a motor structure including end bell support arms directly mounting the motor on a tilt bracket to form an elevating adjustment with a combined splitter plate and blade guard support independently journalled on the stationary table for tilting movement around a pivot disposed close to the table under surface and rearwardly of the table blade opening with its axis in the vertical plane of and coaxial to the tilt bracket pivot and its splitter body in the plane of the saw blade carried by the motor shaft adjacent one end bell in laterally centered relation to the blade opening side walls and having an offset portion disposed to engage in a slot formation of said one end bell and be tilted as the motor, motor shaft and blade tilt.

Still another object of the present invention resides in providing a jointer structure comprising a die cast metal base and rear table element having (a) a motor compartment in the base providing compartment walls apertured to provide respective air inlet and outlet passages, (b) a cutter head compartment open top and bottom and located forwardly of and adjacent the motor compartment and immediately adjacent the front edge of the rear table surface and extending laterally beyond one side of the rear table to communicate with the related motor compartment end to form a longitudinally elongated side pulley compartment and (c) a forwardly extending base portion having a forwardly downwardly inclined top wall formed to provide laterally spaced, upstanding, truncated triangular slide ways separated by a central slotted wall portion; a front table member having (a) depending side walls matingly inclined to cooperate with the inclined base top wall, (b) transversely disposed rib-like walls spaced longitudinally of the table member and grooved at laterally spaced points to matingly slidingly receive the upstanding slide ways of the inclined base side wall, and (c) laterally centered longitudinally spaced tapped bosses located adjacent the respective transversely disposed rib-like walls to mount hold down screws the shanks of which pass downwardly through the slots of the inclined base top wall and a hold down bar disposed to engage the under face of the inclined base top wall under influence of biasing springs surrounding shank portions of the hold down screws adjacent the enlarged heads thereof; and a slide screw mechanism rotatably carried by an upstanding ear on the front end of said forwardly extending base portion and cooperating with a pocketed nut assembly on the under face of the front table member for sliding the front table along the slide ways of the inclined base top wall to adjust the relative planar relationship of the front table work support surface with respect to the cutter head to establish a desired depth of cut.

A still further object of the present invention resides in providing the motor compartment with a novel motor heat dissipation system combining conduction of heat through motor end bells of high heat conductive metal to the rear table and base member also formed of high heat conductive metal, radiation of heat from the motor parts to the motor compartment walls of the rear table and base member and a circulation of ambient air into and through the motor compartment in wiping contact with the motor parts and motor compartment walls back to the ambient air to extract the heat therefrom and deliver it into the ambient air.

Still another object of the present invention resides in providing the motor compartment wall which separates the motor compartment and cutter head compartment with motor mounting pivot ears so located with respect to the rotational axis of the cutter head and the rotor shaft axis of the motor in its operating drive positions that the motor mounting pivot axis lies to one side of a first plane containing the axes of the cutter head and the rotor shaft axis in an area delimited by a plane intersecting the first plane and containing the outer face of the tension side or driving run of a drive belt connecting drive and driven pulleys carried by cutter head and rotor shaft.

A further object of the present invention resides in providing a jointer having a rabbeting arm extending past one end of the laterally extending cutter head compartment with a full view depth of cut indicator comprising a forwardly and downwardly inclined recess wall in an edge of the rabbeting arm having an indicator scale thereon and a reference pointer fixedly mounted on an adjacent portion of the table supporting base for cooperation with said indicator scale.

A still further object of the present invention resides in providing a jointer with adjustable cutter head journal brackets.

Further objects will appear from the following description and appended claims when read in conjunction with the accompanying drawings wherein:

FIGURE 1 is a longitudinal sectional view through the motor of the present invention taken substantially along the line 1—1 of FIGURE 2;

FIGURE 1a is a left-hand end view of the motor illustrated in FIGURE 1 with the left-hand motor end bell, fan, and current shorting rings removed to show the configuration of the motor stator;

FIGURE 1b is a fragmentary view illustrating the support of the power input cord upon the end bell shown in FIGURE 3;

FIGURE 2 is a view of the motor of FIGURE 1 as viewed from the right end of FIGURE 1;

FIGURE 3 is a left side end view of the motor of FIGURE 1;

FIGURE 4 is a sectional view through the end bell illustrated in FIGURE 2;

FIGURE 5 is a sectional view through the end bell illustrated in FIGURE 3;

FIGURE 6 is a front elevational view of the drill press of this present invention;

FIGURE 7 is a side elevational view of the drill press of FIGURE 6;

FIGURE 8 is a top plan view of the drill press of FIGURE 6 with the top cover plate removed;

FIGURE 9 is a vertical section through the drill press of FIGURE 6 taken substantially along the line 9—9 thereof;

FIGURE 10 is a top plan view of the main left side housing casting of the drill press of FIGURE 6;

FIGURE 11 is a side elevational view of the casting of FIGURE 10;

FIGURE 12 is a front elevational view of the casting of FIGURE 10;

FIGURE 13 is a transverse sectional view taken substantially along the line 13—13 of FIGURE 11;

FIGURE 14 is a transverse sectional view taken substantially along the line 14—14 of FIGURE 11;

FIGURE 15 is a vertical elevational view of the interior of the casting of FIGURE 11;

FIGURE 16 is a sectional view taken substantially along the line 16—16 of FIGURE 15;

FIGURE 17 is a transverse sectional view taken substantially along the line 17—17 of FIGURE 20;

FIGURE 18 is a transverse sectional view taken substantially along the line 18—18 of FIGURE 20;

FIGURE 19 is a top plan view of the right hand main body casting of the drill press as viewed in FIGURE 6;

FIGURE 20 is a vertical elevational view of the interior of the casting of FIGURE 19;

FIGURE 21 is a vertical sectional view taken substantially along the line 21—21 of FIGURE 20;

FIGURE 22 is a vertical sectional view taken substantially along the line 22—22 of FIGURE 20;

FIGURE 23 is a fragmentary sectional view taken substantially along line 23—23 of FIGURE 7;

FIGURE 23a is a fragmentary sectional view taken substantially along the line 23a—23a of FIGURE 23;

FIGURE 24 is a diametrical longitudinal sectional view through the driven shaft of FIGURE 6;

FIGURE 25 is a top view of the driven shaft of FIGURE 24;

FIGURE 26 is a diametrical longitudinal sectional view through the quill of the drill press of FIGURE 6 taken substantially along the line 26—26 of FIGURE 27;

FIGURE 26a is a perspective view of a tilting arbor saw constructed in accordance with the principles of the present invention;

FIGURE 27 is an elevational view of the quill of the drill press of FIGURE 6 looking into the peripheral face containing the rack teeth;

FIGURE 27a is a plan view, partly in section, of the saw illustrated in FIGURE 26a;

FIGURE 29 is a right-hand elevation, partly in section, of the saw;

FIGURE 30 is a perspective view of the saw housing or base;

FIGURE 31 is a perspective view of the saw motor and the saw blade;

FIGURE 32 is a side view of the saw motor;

FIGURE 33 is a sectional view of an end bell of the saw motor taken substantially along line 33—33 of FIGURE 34;

FIGURE 34 is an end view of the end bell illustrated in FIGURE 33;

FIGURE 36 is a perspective view of the saw blade and splitter;

FIGURE 38 is a side elevational view partially in section of the jointer embodiment of the present invention;

FIGURE 40 is an end view of the jointer of FIGURE 38;

FIGURE 41 is a fragmentary sectional view taken substantially along the line 41—41 of FIGURE 38;

FIGURE 42 is a fragmentary sectional view taken substantially along the line 42—42 of FIGURE 38;

Figure 28A:
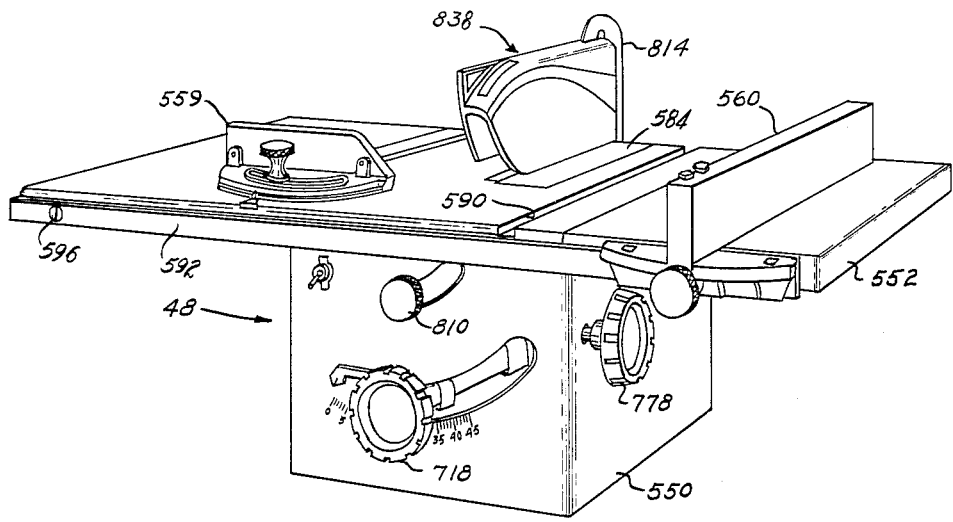
FIGURE 28 is a front elevation, partly in section, of the saw.

In carrying out the foregoing objects, the present invention generally contemplates a major reduction (about thirty percent [30%]) in the size, weight and metal requirements for the given capacity of power driven machine tools of the type which are commonly employed in conventional home or cabinet workshops in order to realize an appreciable conservation of floor space, of work support table and tool housing material, and machining operations and incident expense, thus providing for a significant savings in material, shipping and overall cost of manufacture and assuring a retail selling price of a full capacity machine tool within the means of the home owners or small workshop owners under our present day economy. The present invention is illustrated herein as applied to a drill press 47, a circular saw 48 and a jointer 49, which constitute the common and usually essential tools required in home and cabinet workshops. With the reduction in size and weight, these tools may be easily shifted from one location to another in the workshop thus readily affording a great flexibility in workshop floor plan arrangements to meet assorted and varied conditions and space limitations. In addition, tools, such as the drill press, are readily adaptable for selective hand rather than bench type usage due to the reduction of size and lightness of weight.

In general, the major reduction in size, material and weight of the foregoing machine tools is accomplished in accordance with the present invention by a unique manner of dissipating the motor heat generated in operation of such tools by means of a combined utilization of heat conducting housings and channeling of fluid coolant through novel housing and parts construction and a novel casingless electric motor which is indicated by the reference character 50 and which is constructed and arranged to cooperate with the heat conducting housings to be presently described for more rapidly effectuating the dissipation of heat attributable to the operation of the motor and also the bearing and like heat generated by operation of the machine tool arbor, thus permitting, among other features, the employment of less expensive bearing structures to obtain equal bearing efficiency and life. The specific application of this heat dissipation as applied in each of the tools mentioned will be hereinafter developed.

With the novel heat conducting housings, channeling of fluid coolant and casingless motor, a motor output efficiency (horsepower) is maintained and a developed horsepower is effectively utilized which heretofore was obtainable only by utilization of larger conventional sized casing type motors previously found necessary to drive the machine tool of the type illustrated herein.

THE MOTOR

As best shown in FIGURES 1–5, motor 50 is of the alternating current type and comprises a stator 52, and a rotor 54 surrounded by stator 52 and appropriately non-rotatably mounted on an arbor shaft 56 which is rotatably supported in end bells 58 and 60 spaced axially apart at opposite ends of rotor 54. In accordance with the present invention, end bells 58 and 60 each are formed as an integral die cast structure of lightweight high heat conductive metal such as aluminum or aluminum alloy. Stator 52 includes the usual winding 62 and a laminated core 64 which has a special configuration as will be presently described. As shown in FIGURE 21, winding 62 extends axially beyond core 64 at opposite ends thereof.

With continued reference to FIGURE 1, shaft 56, which is solid, carries two identically constructed centrifugal air ventilating fans 66 and 68 having straight blades generally indicated by the reference character 70 formed as an integral extension of the customary current shorting rings 71 interconnected through the rotor laminations by rods or current bars 72 integrally cast with the rings. The blades 70 of each of the fans 66 and 68 extend radially and axially outward from one side of rings 71. As shown, blades 70 of fan 66 are radially encircled by the portion of stator winding 62 extending axially beyond the left-hand end face of core 64. Fan 68, facing oppositely from fan 66, has its blades 70 radially encircled by the portion of stator winding 62 extending axially beyond the right-hand end face of core 64 in the same manner as fan 66. Shaft 56 is press fitted into the rotor laminations and the rotor 54 is completed by integrally die casting the rings 71, rods 72 and fan blades of lightweight high heat conductive material, such as aluminum or aluminum alloy, thereon.

End bells 58 and 60 are respectively fixedly secured by cap screws indicated at 85 screw threaded into blind tapped bores 85a formed axially inwardly of the annular end faces of stator core 64 which has its individual laminations seam welded together. As a result of welding the laminations of stator core 64 together, the necessity of providing for the conventional form of screw bolts extending completely through the stator to secure the stator and end bells together as a unit is eliminated.

With continuing reference to FIGURE 1, end bells 58 and 60 respectively are formed with inner apertured center bosses 86 and 88 aligning with the rotational axis of shaft 56. Boss 86 is provided with a stepped shaft bore 89 having a smooth cylindrical bearing seat 90 spaced radially apart from shaft 56 to form an annular well for reception of a sleeve bearing 92 made of bronze or other suitable bearing material. Sleeve bearing 92 is axially retained with a press fit on bearing seat 90. Similarly, boss 88 is formed with a stepped shaft bore 93 having a smooth cylindrical bearing seat 94 spaced radially apart from shaft 56 to form an annular well for reception of a ball bearing assembly 96 of conventional form. The ends of shaft 56 protruding axially beyond rotor 54 are journalled in bearing 92 and bearing assembly 96. The right-hand end of shaft 56 (as viewed from FIGURE 1) projects freely through boss 88 and has an extension end 97 extending outwardly beyond end bell 60 for connection with a driven element associated with the machine tools illustrated herein in a manner as will be presently described in detail.

The outer race of bearing assembly 96 is axially confined in abutment with a radially extending shoulder 98 formed on boss 88 by means of a ring 100 acting axially against the outer race of assembly 96 and fixedly secured to end bell 60 as by screws indicated at 102 in FIGURES 1 and 2. The inner race of bearing assembly 96 is axially confined in place between two axially spaced apart split retainer rings 104 and 106 acting against opposite faces of the bearing assembly inner race and seated respectively in peripheral grooves formed in the periphery of shaft 56. By this bearing retaining structure, it will be appreciated that shaft 56 is held axially in place relative to end bells 58 and 60 and stator 52.

The end bells 58 and 60 illustrated in FIGURES 1–5 are constructed for incorporation into the motor powered bench drill 47 and also for jointer 49. A somewhat modified form of the motor end bells to be later described is incorporated into the circular saw 48.

Thus, with continuing reference to FIGURES 1, 2 and 4 end bell 58 is provided with a radial end wall segment 108 extending perpendicularly with respect to the longitudinal axis of shaft 56 and a skirt 110 extending axially inwardly from end wall segment 108. End wall segment 108 is provided with a circumferential row of axially extending air ventilating openings 112 formed closely around boss 86 and axially aligning with blades 70 of fan 66.

As best shown in FIGURE 5, skirt 110 has a continuous segment 114 (FIGURE 2) of generally circular configuration which is castellated to provide axially inwardly directed circumferentially spaced apart arcuate legs 116 (FIGURES 1 and 4) along a uniform radius taken from the center of boss 86 which aligns with the longitudinal axis of shaft 56. The inwardly directed ends of legs 116 are formed with arcuately shaped lips 118 which snugly interfittingly engage the outer smooth cylindrical periphery of stator core 64 and which form semiannular radially extending shoulders 120 on legs 116. Shoulders 120 are contained in a common plane extending perpendicularly to the axis of shaft 56 and snugly abut the left-hand flat annularly shaped end face of stator core 64 as viewed from FIGURE 1. By this end bell and stator structure, radially extending circumferentially spaced apart air ventilating openings 121 are formed between legs 116 as best shown in FIGURE 5.

As best shown in FIGURE 2, the terminal ends of skirt segment 114 are joined by a flat sided imperforate chordal segment 122 having a straight axially inwardly directed edge 124 substantially contained in the plane passing through shoulders 120 and peripherally abutting the left-hand end face of stator core 64 as viewed from FIGURE 1. Stator core 64, as best seen from FIGURES 1, 1a and 2, is provided with a cross-sectional configuration which is essentially the same as that of end bell skirt 110.

As shown in FIGURE 1a, core 64 is formed with a chordal flat 126 interrupting its generally cylindrical exterior surface 124 which has a uniform radius of curvature substantially equal to the radius of curvature of the radially inwardly directed surfaces of lips 118. The purpose for the foregoing flat segmental chordal core and end bell surfaces will be presently described.

As shown in FIGURE 1, boss 86 extends axially beyond the inner and outer wall surfaces of end wall segment 108 with the greater portion of boss 86 extending outwardly beyond segment 108. This portion of boss 86 extending outwardly beyond segment 108 contains bearing sleeve 92 thus positioning bearing sleeve 92 and that portion of boss 86 containing sleeve 92 in the direct path of incoming air being axially drawn toward air inlet openings 112 which closely encircle boss 86 to assure an intimate wiping of cool air over tthe exterior cylindrical surface of boss 86 for removing the bearing heat.

End bell 58 is integrally formed with a hollow conically shaped inlet air baffle 146 extending axially inwardly from end wall segment 108 adjacent the radially outermost edges of air inlet openings 112. Baffle 146 is in surrounding spaced apart relationship to the portion of boss 86 projecting axially inwardly from end wall segment 108 and converges in an axially inward direction in alignment with the rotational axis of shaft 56. As shown, baffle 146 axially extends slightly beyond boss 86 and convergingly channels incoming air into the center of fan 66. As a result of guiding the incoming air into the fan center, a greater fan discharge air flow velocity is realized particularly at the blade tips of the fan than would be the case if no baffle were provided, thus assuring an increased fan efficiency and more definite air flow pattern.

In addition to establishing a high velocity air flow pattern in end bell 58, baffle 146 concentrates the air flowing through inlet openings 112 closely around boss 86. As a result of this strong concentration of air around boss 86 an increased cooling of boss 86 and bearing 92 is obtained. This together with the lesser working pressures exerted on sleeve bearing 92 due to its remote location from the opposite loaded end of shaft 56 avoids the necessity of providing for a more expensive and superior form of bearing, such as a ball bearing together with its more complicated mounting construction. A sleeve type bearing, such as bearing 92, may, therefore, effectively be utilized without diminishing the trouble-free operating life of the motor or reducing the accuracy of motor shaft alignment axially or radially.

With continued reference to end bell 58, a hollowed annular socket 150 is provided forming a through bore with its longitudinal axis extending in parallel radially offset relationship to the longitudinal axis of boss 86. As best seen from FIGURE 5, socket 150 is axially outwardly directed from end wall segment 108 and protrudes slightly beyond boss 86 with a common wall portion indicated at 151 dividing the interiors of socket 150 and boss 86 respectively. Socket 150, as best seen from FIGURE 3, is formed radially inwardly of the outer surface of chordal segment 126.

Received in socket 150 is an overload relay 152. Electrical conductors indicated at 156 are connected to relay 152 and extend through socket 150 for connection with stator 52.

With the foregoing construction of end bell 58, fan 66 is disposed in an air ventilating chamber 130 (FIGURE 1) defined by end bell 58 and the left-hand end faces of rotor 54 and stator core 64 as viewed from FIGURE 1. An air baffle 146 directs air axially inwardly through openings 112 into fan 66 which in turn propels the air radially in intimate wiping contact with ring 71 absorbing heat conducted to ring 71 from rotor 54. After wiping the axially outwardly directed face of ring 71, the heated air is radially discharged at the tips of blades 70 where it impinges against the inwardly facing axially directed surfaces of stator winding 62 which deflects the air flow back toward end wall segment 108 of end bell 58. As a result, the air discharged from fan 66 is swept axially between winding 62 and end wall segment 108, thus intimately wiping the interior surface of end wall segment 108 to transfer heat to end bell 58 transmitted to the air from rotor 54 and to also facilitate the transfer of heat from stator winding 62 to end bell 58 by convection. As the air flows radially beyond stator winding 62, it is deflected axially inwardly by skirt 110 into a confined annular space between stator winding 62 and skirt 110 to wipe the radially outwardly directed surfaces of winding 62 and the radially inwardly directed surfaces of skirt 110 thus absorbing and transferring further heat from winding 62 to end bell 58 by convection.

The axially directed stream of air passing radially between stator winding 62 and end bell skirt 110 impinges against the end face of stator core 64 and is finally discharged outwardly through outlet openings 121 carrying that portion of heat not transferred to end bell 58.

By guiding the cooling air along the above-described sinuous path, an efficient wiping of the surfaces of ring 71 and stator 52 exposed in chamber 130 is accomplished and heat generated in stator 52 and rotor 54 by operation of motor 50 is carried away by the air stream. Also, by intimately wiping the entire interior surface of skirt 110 and substantially the entire interior surface of end wall segment 108, an appreciable amount of heat is transferred from stator 52 and rotor 54 by convection.

By intimately contacting stator core 64 with legs 116 of end bell 58, a further appreciable amount of heat is directly transferred to end bell 58 from core 64 by conduction. Since end bell 58 is made of high heat conductive metal such as aluminum or aluminum alloy, all of the heat transferred to the end bell is quickly withdrawn for dissipation into the air in a manner as will be presently described.

With continuing reference to FIGURES 1, 2 and 4, end bell 58 is formed with a flat sided motor mounting ear 134 extending radially outwardly from skirt 116 and having converging wall faces 136 and 138 terminating in a rounded outer end portion 140 thus providing for a large cross-sectional area adjacent to skirt 110 for conducting heat away from skirt 110. Ear 134 is formed with a pivot rod mounting bore 142 adjacent the outer end thereof. The axis of bore 142 extends parallel to the rotational axis of shaft 56 and the center of bore 142 is along a line passing radially through the center of shaft 56.

End bell 60 is substantially identical to end bell 58 except that it does not provide a socket 150, omits baffle 146 and the chord strain relief ear and provides, through boss 88, a ball bearing seat. Therefore, the same reference numerals have been applied in the drawings.

As shown in FIGURES 1, 1a, 2 and 3, the outwardly facing surface of chordal segments 122 is substantially contained in the plane of the flat stator core chordally extending surface 126. As a result, a substantially smooth flat chordal motor face is provided from between the axially outwardly directed faces of end bells 58 and 60. This flattened chordal motor surface is utilized to accomplish a transfer of heat by direct conductive surface-to-surface abutment as will be particularly described, in the embodiment of the circular saw 48.

The integral high heat conductive character of fans 66 and 68 on rings 71 and their associated rods 72 further provides a high heat conductive path directly from the center of rotor 54 to the ring and fan structure at each end. As a result, operational motor heat is extracted from the rings and fan blades by the circulating air cooling the rotor end structure and encouraging heat flow toward and into the end bells.

The operational heat collected by end bells 58 and 60 is rapidly and harmlessly dissipated to surrounding ambient atmosphere and is also transferred away through heat conductive paths formed by motor mounting ears 134 which enable the transmission of operational heat to motor and tool mechanism housing wall surfaces of large heat dissipating areas serving in effect as radiation surfaces. The manner in which the dissipation of operational motor heat is specifically accomplished will be described hereinafter with respect to each of the embodiments of drill press 47, saw 48 and jointer 49.

With the foregoing casingless motor and end bell construction, it is clear that the exterior surfaces 124 and 126 of stator core 64 are fully exposed. These exposed exterior stator core surfaces 124 and 126, as will hereinafter be explained in greater detail, radiate heat directly into the surrounding air or conduct heat into other radiating elements of the tools exposed to cooling air circulation.

As a result of the rapid heat dissipation facilated by conduction, convection and radiation as heretofore described, the overall axial and diametrical size of stator core 64 and rotor 54 may be effected when the present invention is employed effecting a reduction of substantial significance in overall size, weight and cost of the entire machine.

As best shown in FIGURES 1b and 3, and electrical motor lead guide retainer structure 157 is formed on end bell 58 and comprises an arm 158 extending radially inwardly over an aperture 158a formed in end wall segment 108. Arm 158 is spaced axially outwardly with respect to the axially outwardly directed end face of end wall segment 108 and is formed, at its outer free end, with an axially inwardly directed post 158b extending toward aperture 158a approximately midway between opposed edges 159 of aperture 158. Cooperating with post 158b are a pair of posts 159a projecting axially outwardly from the outwardly directed end face of wall segment 108 adjacent to edges 159. Posts 158b and 159a extend along a common upright line as best seen in FIGURE 3.

With the foregoing wire retaining construction, the electrical cord sheath 159b containing the electrical current supplying conductors to motor 50 is threaded under arm 158 and into aperture 158a in the manner shown, with posts 158b and 159a engaging sheath 159b to securely retain it in place. Thus, it is clear that the foregoing construction prevents the electrical supply conductors contained in sheath 159b from being pulled away from the connecting motor terminals and thereby prevents any strain from being applied to the connection of the electrical supply wires on the motor terminals.

THE DRILL PRESS

Referring now to FIGURES 6–27 and more particularly to FIGURES 6 and 7, drill press 47 is of the motor powered bench type and is adaptable for selective hand or portable usage as will presently be explained in detail. Drill press 47 comprises a rigid upright tubular column 160 fixedly mounted at its lower end on a bench-type base 162 of conventional form. A conventional work supporting table 164 adjustably mounted on column 160 is clamped in a selected fixed position along column 160 by means of a manually manipulatable clamping lever 166 in the usual manner.

Mounted on the upper end of support column 160 vertically above table 164 is a drill head assembly which is generally indicated by the reference characters 168 and which includes a novel elongated two piece motor and operating mechanism housing 170. Housing 170 is longitudinally split into two hollowed mating thin walled housing halves 172 and 174 as best shown in FIGURES 6, 8 and 9.

With reference now to FIGURES 6–22, and as best seen from FIGURES 6, 8, 13 and 18, housing halves 172 and 174 of the present invention each are formed with a configuration approximately corresponding to a clam shell with each of the halves being formed as integral die cast structures of lightweight high heat conductive metal. Housing halves 172 and 174 are preferably die cast from aluminum or they may be cast from an aluminum alloy.

As best shown in FIGURES 6, 8, 10, 13–15, and 17–20, housing halves 172 and 174 are respectively formed with delimiting longitudinal mating edges 176 and 178 to the rear of support column 160 and with delimiting longitudinal mating edges 180 and 182 forwardly of column 160. The rearward mating edges 176 and 178 extend throughout the entire length of housing 170 and the forward mating edges 180 and 182 respectively extend downwardly from outwardly directed cover abutment edges 184 and 186 and terminate approximately midway between the ends of housing 170 in opposed parallel spaced oppositely offset edges 188 and 190 (FIGURES 6 and 15). Edges 188 and 190 extend downwardly to the quill end of housing 170 providing an elongated longitudinal space 191 (FIGURE 6) for a purpose as will presently appear.

As best shown in FIGURES 8 and 12, housing halves 172 and 174 are respectively formed with interfittingly overlapping lips 192 and 194 projecting from mating edges 180 and 182 to assure a seating alignment of housing halves 172 and 174 in assembled relationship.

With continuing reference to FIGURES 6–22, and particularly to FIGURES 8, 10, 13, 14 and 17–19, housing halves 172 and 174 are opposingly dished, diverging outwardly from their respective mating abutment edges 176 and 178 and then curving inwardly near the quill end of housing 170 with a generally clam shell shaped curvature.

Since the construction of housing halves 172 and 174 now to be described is substantially identical, with certain exceptions to be presently explained, only the construction of housing half 174 will be described with like reference characters being applied to designate like structure in housing half 172.

Thus, with continued reference to FIGURES 10–22 and particularly to FIGURES 9, 10, 15, 19 and 20, housing halves 172 and 174 are illustrated to be divided into a required number of opposingly mating motor and operating mechanism cavities with housing half 174 having a longitudinal driven shaft and quill cavity 200. Cavity 200 is delimited by two transverse parallel spaced apart rib-like quill-receiving half-collar portions 204 and 205 and is longitudinally confined between housing abutment edge 182 and a longitudinal rib 206 spaced inwardly from abutment edge 182. Rib 206 is joined by half-collar portions 204 and 205 to a housing end wall segment 208 delimiting cavity 200 and extending downwardly and inwardly from an outwardly directed, peripherally flanged upstanding end wall segment 209 which terminates in the outwardly facing cover abutment edge 186 and which has a portion 209a (FIGURE 20) projecting forwardly beyond end wall segment 208 for a purpose as will presently appear.

As best shown in FIGURES 18 and 20, half-collar portions 204 and 205 are longitudinally aligned with portion 205 being adjacent to the drill chuck end of housing 170 and with portion 204 being disposed inwardly of portion 205 approximately midway between the ends of housing 170.

With continued reference to FIGURES 10–22 and particularly to FIGURES 9, 10, 15, 19 and 20, housing half 174 is provided at its oppositely facing ends with two longitudinally spaced apart support column clamp cavities 212 and 214 which are confined between mating abutment edge 178 and longitudinal rib portions 215 and 216 respectively. Rib portions 215 and 216 substantially align with each other and extend parallel to abutment edge 178 and inwardly thereof. Cavity 212 is transversely confined by two spaced apart aligned inwardly directed column clamping ear portions 218 which extend normally to the longitudinal axis of column 160 and which have aligned semicircular recesses 219 formed with a slightly smaller radius than that of column 160 to interfittingly and abuttingly encircle substantially one-half of the periphery of the support column.

Similarly cavity 214 is transversely confined by two inwardly directed column clamping ear portions 220 extending normal to the longitudinal axis of support column 160. Portions 220 are formed with semicircular recesses 221 in alignment with recesses 219 and with the same radius as that of recesses 219 to correspondingly interfittingly and abuttingly encircle substantially one-half of the periphery of the support column.

Housing half 174 further is provided with a longitudinally extending motor housing cavity 222 longitudinally delimited by rib portion 206 and a longitudinal rib portion 223 extending parallel to rib portion 206 in substantial alignment with rib portions 215 and 216. Cavity 222 is transversely delimited by an irregularly curved shelf portion 224 near the motor pulley end of housing half 174 and a confining end wall segment 226 at the opposite end of housing half 174.

As best shown in FIGURE 20, shelf portion 224 extends substantially normal to the axis of column 160 and to longitudinal rib portions 206 and 223. End wall segment 226 extends from rib portion 216 and has an inwardly offset portion 228 joined to rib portion 206 adjacent half-collar portion 205.

With continuing reference to FIGURES 6–22 and particularly to FIGURES 9, 10, 15, 19 and 20, housing half 174 is formed with an outwardly opening elongated pulley housing cavity 230 delimited by end wall segment 209 which extends rearwardly from its overhanging portion 209a (FIGURE 20) and terminates in a small end wall segment 232 formed adjacent ear portions 218 and column 160 as best seen from FIGURE 19. Also delimiting pulley housing cavity 230 is shelf portion 224 which extends from end wall segment 232 and joins with the upwardly turned flanged segment 209. By this housing structure, it is clear that pulley housing cavity 230 overlies motor housing cavity 222 and quill and spindle cavity 200 and overhangingly extends forwardly beyond end wall segment 208 which delimits cavity 200 to provide for an outwardly opening pulley receiving cavity of enlarged transversely extending configuration.

As best shown in FIGURES 19 and 20, shelf portion 224 normally intersects a semiannular socket wall 236 forming a quill and spindle assembly bearing cavity 238 and having an axis extending parallel to recesses 219 and 221 and longitudinally aligning with half-collar portions 204 and 205.

As best shown in FIGURES 15 and 20, socket 236 extends inwardly beyond rib portion 224 and terminates in longitudinally spaced apart relationship to half-collar portion 204 thus providing for a longitudinal separation between cavity 200 and cavity 238. Socket wall 236 also extends upwardly beyond rib portion 224 and peripherally flanged segment 209 and is provided with a pair of apertured diametrically opposed clamping ears 240 above rib portion 244. Ears 240 have aligned flat abutment faces 241 adapted to abut corresponding faces on ears 240 of housing half 172.

With particular reference to FIGURES 15 and 20, rib portion 206 extending upwardly from cavity 200 joins with socket wall 236 thus forming an intermediate quill and spindle assembly cavity 242 delimited by rib portion 206 and abutment edge 182 with end wall segment 208 and extending longitudinally between cavity 200 and cavity 238. The inwardly facing edge of rib portion 206 is set back from a plane passing through housing abutment edges 178 and 182 as best shown in FIGURES 13, 14, 17 and 18 to allow for free circulation of air between motor housing cavity 222 and the quill and spindle assembly cavities 200 and 242 for a purpose as will presently become apparent.

As best shown in FIGURES 13–15 and 17–20, housing half 174 is formed with a transversely inwardly directed ledge 244 extending between rib portions 206 and 223 above end wall segment 226 and joined to end wall segment by a depending inwardly offset wall segment 246. Ledge 244 is formed with a row of air ventilating inlet openings 248 for introducing air into the interior of housing 170. Wall segment 226 is recessed at 249 to cooperate with the mating wall segment 226 of housing half 172 to form a central air inlet opening.

To permit the removal of air from the exterior of housing 170, shelf portion 224 is provided with an enlarged recess 250 (FIGURES 10 and 19) establishing direct fluid communication between motor housing cavity 222 and pulley housing cavity 230, and with a set of air ventilating outlet openings 252 (FIGURES 10 and 19) establishing direct fluid communication between pulley housing cavity 230 and quill and spindle assembly housing cavities 200 and 242.

Ears 218 and ears 220 are respectively joined together by an upstanding cavity delimiting wall segment 255 and by wall segment 246 (FIGURES 15 and 20). Wall segments 255 and 246 have bolt holes for fastening housing halves 172 and 174 together as will now be described.

In order to securely fasten housing halves 172 and 174 together as a unit, two pairs of bolt and nut assemblies 256, 258, 260 and 262 and a machine screw 264 are provided for. Assemblies 256 and 258, as best shown in FIGURES 8 and 9, are arranged with their bolts extending through the respective apertured ears 240 of housing halves 172 and 174 along parallel axes extending normal to the longitudinal axis of cavity 238, thus securely clamping ears 240 of housing halves 172 and 174 together. Consequently, bolt and nut assemblies 256 and 258 secure the upper left-hand corners of housing halves 172 and 174 together as viewed from FIGURE 7.

Bolt and nut assembly 260 has its bolt extending through the aligned bolt holes in the respective wall segments 255 of housing halves 172 and 174 along an axis extending between ears 218 and rearwardly of column 160 at right angles thereto. Similarly bolt and nut assembly 262 has its bolt extending through the aligned bolt holes in the respective wall segments 255a of housing halves 172 and 174 along an axis passing between ears 220 rearwardly of column 160 and in parallel relation to the axis of bolt and nut assembly 260. Thus, bolt and nut assemblies 260 and 262 respectively securely clamp together the upper and lower right-hand column corners of housing halves 172 and 174 as viewed from FIGURE 7.

Screw 264 passes through an aperture 268 (FIGURE 15) formed in wall segment 246 of housing half 172 and is threadedly secured in an inwardly directed boss 270 (FIGURE 20) formed on housing half 174 adjacent half-collar portion 205, thus clampingly securing the lower left-hand corner of housing halves 172 and 174 as viewed from FIGURE 7.

In order to fixedly mount housing 170 on support column 160, a pair of bolt and nut assemblies 272 and 274 are provided for as best shown in FIGURE 9. The bolts of assemblies 272 and 274 respectively extend through the wall segments 255 and 246 of housing halves 172 and 174 inwardly of column 160 in parallel spaced apart relation to nut and bolt assemblies 260 and 262. The axes of bolt and nut assemblies 272 and 274 are contained in respective planes passing normal to the axis of column 160 and through the respective axes of assemblies 260 and 262 with their related bolt shanks being in close tangential relationship to the periphery of column 160. By this structure, it is clear that the respective ears 218 of housing halves 172 and 174 are tightly clamped by assemblies 272 and 274 in snug surrounding abutting relationship with support column 160 which engagingly extends through the ear recesses 219 (FIGURES 15 and 20) after passing upwardly through the respective lower ear recesses 221.

With housing halves 172 and 174 in assembled relation as previously described, it is clear that cavities 200, 212, 214, 222, 230, 238 and 242 of housing half 174 respectively mate with correspondingly designated cavities in housing half 172. Also, it is apparent that support column clamping ears 218 and 220 together with ears 240 and socket wall 236 of housing half 174 matingly align with correspondingly designated components of housing half 172. In the same manner, the various previously described rib and shelf portions of housing half 174 align with the correspondingly designated components of housing half 172.

With the foregoing housing and support column clamping construction, it will be appreciated that by loosening only bolt and nut assemblies 272 and 274, housing 170 may be slidably shifted along column 160 or it may be removed from column 160 with housing halves 172 and 174 still securely fastened together in the manner previously described. This feature particularly enables portable or hand usage of drill head assembly 168 as will become more readily apparent as the description proceeds.

With continuing reference to FIGURES 6–9, drill head assembly 168 includes a motor and operating mechanism 280 (FIGURES 8 and 9) mounted in and supported solely by housing 170. Mechanism 280 comprises a drill spindle 284 received in the respective mating cavities 200 and 242 of housing halves 172 and 174 and having its chuck end extending beyond housing 170 and carrying, at its lower end, a chuck 286 within which a drill (not shown), or other tool is held for working engagement with the work material (not shown) mounted on work supporting table 164.

Spindle 284 coaxially extends through a rigid axially reciprocable tubular quill 288 and is journalled in quill 288 on longitudinally spaced apart sleeve bearings 290 and 292 which are preferably made of sintered bronze. Quill 288 is formed as a one-piece die cast structure of a lightweight high heat conductive metal which is preferably aluminum.

As best shown in FIGURES 9, 26 and 27, quill 288 is formed with oppositely facing recessed lubricant-well end portions 294 and 296 integrally joined by an intermediate body portion 298 having a reduced internal diameter and a longitudinal rack 300.

Sleeve bearings 290 and 292 are respectively extended into body portion 298 with a press fit and are respectively provided with radially outwardly extending flange portions 304 and 306 snugly seated on annular recessed shoulders 308 and 310 formed inwardly of opposite end faces of quill 288.

As best shown in FIGURE 9 sleeve bearings 290 and 292 respectively form with end portions 294 and 296 annular lubricant chambers 312 and 314 which are filled with suitable lubricant through radially extending lubricant holes 316 and 318 formed in quill 288.

With continued reference to FIGURES 9, 26 and 27, a bearing mounting collar 320 is fixedly secured to the lower end of spindle 284 axially between chuck 286 and quill 288 and is formed with flat opositely directed end faces 322 and 324 respectively abutting correspondingly flat surfaces of chuck 286 and a radially extending end flange portion 326 formed integral with quill 288. Collar 320 is provided with a recessed annular shoulder 328 axially inwardly of end face 324 on which is seated a thrust bearing 330 abuttingly engaging sleeve bearing flange 306.

Adjacent the upper end of quill 288, a collar 332 fixedly secured to spindle 284 by means of a set screw 334, is provided with a flat end face 336 abuttingly engaging sleeve bearing flange 304. By the foregoing quill and spindle mounting structure, it is clear that spindle 284 is journalled in quill 288 and is axially retained on quill 288 by collars 320 and 332.

Referring now to FIGURES 6–9 and 23, quill 288 is longitudinally advanced and retracted by means of a one-piece feed shaft 340 having a pinion 342 fixedly secured thereto as by brazing and meshing with rack 300. Feed shaft 340 is provided with an enlarged diametered handle section 344 and a reduced diametered section 346 forming with section 344 a radially extending annular shoulder 348 snugly abutting pinion 342.

Shaft section 346 is journalled in and extends through a bore 350 formed through a boss 352 which is integral with housing half 174 and which projects outwardly from the exterior surface of the housing along an axis extending normal to the axis of spindle 284 and column 160. A rod-shaped feed handle 354 extends through diametrically opposed radially extending bores 355 in the outer end of feed shaft section 344 extending beyond boss 352, and is manually manipulatable to selectively rotate shaft 340 in the usual manner.

As best shown in FIGURE 23, feed handle 354 is retained in place on feed shaft 340 by means of a coil spring 358 received in a blind bore 360 formed inwardly of the outer end of feed shaft section 344 coaxially with the rotational axis of shaft 340 and in intersecting relationship with bores 355. Spring reacts against a bottom end wall 362 in shaft bore 360 to biasingly engage the intermediate portion of feed handle 354 extending transversely through bore 360, thereby urging handle 354 into frictional retaining engagement with the smooth cylindrical wall surfaces of shaft bores 355.

With continued reference to FIGURE 23, feed shaft section extends through and is journalled in a bore 366 formed in a boss portion 368 and coaxially aligned with bore 350. Boss portion 368 is integral with housing half 172 and projects inwardly from an upstanding end wall segment 370 of an outwardly opening axially elongated quill return spring recess 372 formed in housing half 172. Boss 368 has a flat end face extending normal to the rotational axis of shaft 340 and matingly abutting the opposing end face of pinion 342 when the latter is in meshing engagement with rack 300.

As shown, recess 372 is disposed adjacent to and inwardly of cavity 200 of housing half 172 and is formed by an outwardly directed annular socket portion 374 which is integral with housing half 172.

With reference to FIGURES 23 and 23a a generally cylindrical hollow quill return spring casing 376 is axially received in recess 372 in interfitting sliding engagement therewith. Casing 376 is provided with diametrically opposing radially outwardly projecting tongue formations 378 on its outer wall which are matingly received in diametrically opposed axially directed groove formations 380 formed in the socket wall portion 374 of recess 372. By this structure casing 376 is permitted to slide axially in recess 372 but is retained against rotation relative to housing 170.

As best shown in FIGURE 23, feed shaft section 346, which is of smaller diameter than section 344, extends axially into recess 372 and terminates in a reduced diametered end section 382 which projects outwardly beyond recess 372 when pinion is in meshing engagement with rack 300 and which forms with shaft section 346 a radially extending outwardly directed annular shoulder 384. As shown, shaft section 382 extends freely through a flat sided end wall portion 386 of casing 376 to permit shaft 340 mediately adjacent to shoulder 384, as shown. A clock type spiral spring 388 received in casing 376 is mounted in surrounding relationship to shaft section 382 and has its inner end fixed to shaft section 382 in a manner as will be described and its outer end fixedly secured to an annular wall 390 of casing 376 in any suitable manner.

By means of the foregoing spring and casing construction, feed shaft 340 is biased by spring 388 to urge quill 288 upwardly in a tool retracting direction through the meshing engagement of pinion 342 with quill rack 300. Thus, by rotation of feed shaft 340 in a clockwise direction (as viewed from FIGURE 9) to advance quill 288 and spindle 284 in a tool feeding direction, spring 388 is energized, and when feed handle 354 is released by the operator, the energy stored in spring 388 axially retracts quill 288 and spindle 284 to the positions shown in the drawings.

As shown in FIGURE 9, a bumper-type O-ring 394 of suitable resilient shock absorbing material is seated in a peripheral groove 395 formed in quill 288 immediately adjacent to and inwardly of the quill flange portion 326 as shown in the drawings, the outwardly directed end of quill 288 having flange portion 326 is received in an outwardly directed well 396 formed by housing halves 172 and 174 when quill 288 is returned to its fully retracted position shown in the drawings. In this position, O-ring 394 is compressed under the bias of spring 388 between quill flange portion 326 and the respective collar portions 205 of housing halves 172 and 174 to absorb any shock resulting from a rapid return of quill 288 to its fully retracted position.

With continued reference to FIGURES 23 and 23a, feed shaft section 382 is provided with a diametrical slot 398 which extends inwardly from the outwardly directed end and receives the inner end of spring 388. Received in mating arcuate surfaces of slot 398 near its outer end is a diametrical pin 400 which extends beyond the periphery of shaft section 382 for fixedly mounting a retaining ring 402 thereon axially outwardly of spring 388.

Ring 402 is axially engageable with spring 388 in casing 376 to hold the spring against relative axial movement with respect to shaft section 382.

With the foregoing quill feed construction, it will be appreciated that shaft 340 is selectively axially shiftable from the position shown in the drawings to a position where it is partially withdrawn from housing 170 and where pinion 342 is completely disengaged from rack 300 and shifted to one side thereof. When pinion 342 engages rack 300 in the position of component parts illustrated in the drawings, casing 376 is disposed adjacent the outer end of recess 372 and ring 402 is disposed substantially beyond the recess. A coil spring 404 surrounding shaft section 344 biasingly engages the right-hand end face of pinion 342 (as viewed from FIGURE 23). Spring 404 reacts against housing half 174 to bias shaft 340 together with pinion 342, casing 376, spring 388 and ring 402 to the positions shown in the drawings where pinion 342 engages rack 300.

To withdraw feed shaft 340 in order to disengage pinion 342 from rack 300, the operator grips feed handle 354 and pulls it away from housing 170 thus shifting shaft 340 outwardly against the bias of spring 404. As feed shaft 340 is shifted axially to the right, as viewed from FIGURE 23, ring 402 abuttingly engages spring 388 to axially shift spring 388 and casing 376 inwardly toward end wall segment 370 of recess 372.

Recess 372 has a sufficient length to assure complete disengagement of pinion 342 from rack 300 before casing end wall 386 is shifted into abutment with wall segment 370 of recess 372. The axial length of feed shaft section 346 extending from the left-hand end face of pinion 342, as viewed from FIGURE 23, to shoulder 384 is sufficient to assure that casing 376 with spring 388 is located at the outer end of recess 372 when pinion 342 butts against end wall segment 370 of recess 372. In the position of parts shown, it is clear that boss 368 limits the axial displacement of pinion 342 together with feed shaft 340 under the bias of spring 404 to assure that pinion 340 aligns with quill 288 with the teeth of pinion 340 in full meshing engagement with quill rack 300 when shaft 340 is axially released to ride inwardly to the position illustrated.

Thus, with the foregoing structure enabling pinion 342 to be disengaged from rack 300 by axially withdrawing feed shaft 340, the tension of spring 388 may be selectively varied for adjusting the rate of spindle and quill assembly return to accommodate the weight of various tools employed in the workshop.

As shown in FIGURES 6, 7 and 23, a depth of cut gauge 408 comprises a split stop collar 410 relatively rotatively carried by feed shaft section 346 axially between feed handle 354 and housing 170. A collar screw 412 extending through mating ears 413 on collar 410 enables collar 410 to be fixed in a selected relative angular position on feed shaft 340. Fixed to collar 410 and extending axially inwardly therefrom in spaced apart parallel relation to the axis of shaft 340 is a stop pin 414 which projects into an outwardly opening arcuate groove 416 formed in boss portion 352. Groove 416 is coaxially related to the rotational axis of feed shaft 340 and has an angular length which is less than 360° to form, on boss 352 peripherally oppositely facing spaced apart stop surfaces indicated by the reference characters 418 and 419. A graduated depth of cut scale indicated at 420 provided for on an outwardly directed surface of boss 352 cooperates with an index 422 on collar 410. Index 422 and stop pin 414 are so angularly arranged that when pin 414 abuts surface 419 index 422 will align with the depth of cut graduation marked zero.

In order to establish a selected depth of cut with the foregoing depth gauge construction, quill 288 is advanced to a position where the tool (not shown) in chuck 286 touches the work material. With feed shaft 340 held stationary at this advanced position, collar 410 then is rotated relative to shaft 340 to the graduation on scale 420 designating the desired depth of cut to be made. Screw 412 then is tightened to fix collar 410 in this position and quill 288 is retracted preparatory to a tool feeding advancement. Thus, it is clear that as quill 288 is advanced, the tool (not shown) will cut into the material (not shown) and pin 414 will advance in a counterclockwise direction as viewed from FIGURE 7. When pin 414 reaches the end of groove 416 and abuts surface 419, further tool feeding advancement is prevented. Thus, it is clear that the tool has cut into the work by a depth corresponding to the value of the graduation on scale 420 at which index 422 was originally set.

With continued reference to FIGURES 8 and 9, quill 288 extends upwardly through housing cavities 200 and through the respective mating collar portions 204 and 205 of housing halves 172 and 174 which guide quill 288 in its reciprocatory movements. The upper end of spindle 284 extends upwardly into the mating housing cavities 200 and 242 of housing halves 172 and 174 and interfittingly projects into a spindle drive sleeve 424 as best shown in FIGURES 9 and 24.

With continued reference to FIGURE 24, drive sleeve 424 is formed with a pair of internal diametrically opposed spindle engaging splines 426 (FIGURE 25) extending radially inwardly adjacent the lower end of the drive sleeve. The bore 427 of drive sleeve 424 is relieved above splines 426 for a purpose as will presently appear. Splines 426 are matingly receiving in diametrically opposed uninterrupted grooves 428 (FIGURE 9) formed in spindle 284 to establish a drive connection between sleeve 424 and spindle 284 so that the spindle and drive sleeve rotate as a unit. Grooves 428 extend upwardly to the outer pulley end of spindle 284 from a position located normally below sleeve 424. Alternatively, but not illustrated, drive sleeve 424 could be internally grooved from end to end at diametrical points and the upper end of spindle 426 could then be diametrically slotted to receive a plate-like feather connector held in place therein by a roll pin extending through suitably aligned passages in the split ends and plate.

As best shown in FIGURES 8 and 9, drive sleeve 424 extends through the respective mating cavities formed by socket portions 236 of housing halves 172 and 174 and is journalled on longitudinally spaced apart sleeve bearings 430 and 432 which are preferably made of bronze and which are received in opposed recessed end portions formed by socket portions 236. Sleeve bearing 430 extends inwardly from the downwardly directed end faces of socket portions and is seating on mating semiannular radially extending shoulders 433 formed in socket portion 236. Similarly sleeve bearing 432 extends inwardly from the upwardly directed end faces of socket portions 236 and is seated on mating semiannular radially extending shoulders 434 formed in the socket portions.

Sleeve bearings 430 and 432 are securely clamped in place by bolt and nut assemblies 256 and 258 with sleeve bearing 430 being positioned below the mating housing shelf portions 224 and sleeve bearing 432 being positioned above the mating housing shelf portions 224.

The lower end of drive sleeve 424 is formed with a radially outwardly extending flange portion 436 engaging with a thrust washer 438 which is in clamped bearing relation to the downwardly facing edge of bearing 430 and the end faces of socket portions 236.

As shown in FIGURE 9, drive sleeve 424 extends upwardly beyond the mating socket portions 236 and is formed with an upper end portion 440 of reduced external diameter. Extending radially outwardly from end portion 440 (FIGURE 24) are diametrically opposed splines 442 (FIGURE 25) received in mating diametrically opposed grooves formed in a hub portion 444 of a stepped spindle pulley 446 (FIGURE 9) to provide a drive connection therebetween. Hub portion 444 is seated on annular shoulder 445 formed on drive sleeve 424.

Drive sleeve 424 is axially retained in place by means of a split retainer ring 448 seated in a groove formed in the periphery of drive sleeve 424 axially outwardly of splines 442. Ring 448 abuttingly engages the top face of pulley 446.

Thus, by the engagement of ring 448 and flange portion 436 with their respective components parts, drive sleeve 424 is axially retained in the position shown.

Pulley 446 is of the stepped-cone multigroove type, as will hereinafter be described in further detail, and has an upper small diametered annular cone 450, an intermediate diametered annular cone 452 and a lower large diametered annular cone 454. Pulley 446 is formed as a one-piece die cast structure of lightweight high heat conductive metal such as aluminum or aluminum alloy.

As best shown in FIGURE 8, radially extending annular wall portions 456 are formed between cone 450 and hub 444, and also between cones 450 and 452. Wall portions 456 have openings indicated at 458 to provide for air flow passages directly through pulley 46 for a purpose as will presently become apparent.

As shown in FIGURE 9, pulley 446 is formed with a hollowed interior into which the socket portions 236 and drive sleeve 424 extend with sleeve bearing 432 positioned radially inwardly of cone 452. By disposing sleeve bearing 432 in the foregoing manner and by positioning sleeve bearing 430 below bearing 432 radially outwardly of splines 426, the reactive aligning forces exerted by bearings 430 and 432 are widely spaced apart relative to the belt pull exerted on spindle pulley 446. With this arrangement, the reactive force exerted by sleeve bearing 430 is spaced by an appreciable linear distance below sleeve bearing 432 and thus acts along a long moment arm extending between bearings 430 and 432 to effectively resist and counteract canting forces imparted to spindle 284 by belt pull even when the canting belt pull force is applied above sleeve bearing 432.

By relieving the bore of drive sleeve above splines 426 and by radially aligning the reactive force of bearing 430 with the drive connection established by splines 426 in spindle grooves 428, negligible canting forces imparted to the portion of spindle 284 above sleeve bearing 430 do not bind the spindle with quill 288 or cause misalignment of the spindle below bearing 430. Thus, it is clear that with the foregoing cooperative drive sleeve bearing and driving connection construction, the alignment of spindle 284 in quill 288 is unaffected by motor belt pull acting through the spindle pulley 446. Consequently, the alignment of spindle 284 with quill 288 is maintained to assure for an accurate tool alignment relative to the work material.

With quill and spindle operating mechanism thus far described, it will be appreciated that quill 288, spindle 284 and chuck 286 may be removed as a unit through the bottom tool opening formed by housing halves 172 and 174 simply by axially withdrawing feed shaft 340 in the manner previously described to disengage pinion 342 from rack 300. With pinion 342 disengaged from rack 300, spindle is freely slidable out of drive sleeve 426 thus allowing the easy and rapid removal of the quill and spindle assembly to enable the replenishment of lubricant in wells 312 and 314 or to facilitate replacement of parts.

With continued reference to FIGURES 8 and 9, spindle pulley 446 is illustrated to be disposed in the mating pulley housing cavities of housing halves 172 and 174 respectively. A multigrooved endless motor belt 462 extends around spindle pulley 446 and around a motor pulley 464 of the stepped-cone multigrooved type as will be presently described in detail. Pulley 464 is mounted on shaft 56 of motor 50 by means of a set screw 466. Shaft 56, as shown in FIGURE 9, extends downwardly from the mating pulley housing cavities 230 and into the mating motor housing cavities 222 through the opening formed by the recessed portions of the mating housing shelves 224.

As shown in FIGURES 8, 9, motor 50 is disposed in the mating cavities 222 of housing halves 172 and 174 and is pivotally mounted on an upstanding pivot rod 468 along a longitudinal axis extending parallel to the rotational spindle axis and the axis of support column 160. Rod 468 extends through the bores 142 formed in end bell ears 134. Ears 134 of end bells 58 and 60 respectively abuttingly extend between longitudinal spaced apart upper and lower mounting ears 470 and 472 (FIGURES 13 and 15) formed integrally with housing half 172. The housing ear 472 is formed with a longitudinal blind bore 474 (FIGURES 13 and 16) which aligns with a through bore 476 (FIGURES 10 and 13) formed in housing ear 470. Pivot rod 468 is axially seated in bore 474 and extends upwardly from bore 474 and passes through housing bore 474 after passing through bores 142 of motor end bell ears 134. Pivot rod 468 is of sufficient length to extend upwardly beyond ear 470, thus enabling the rod to be easily removed by lifting it upwardly for removal of motor 50 from housing 170.

As shown in FIGURE 8, a motor spring 478 is provided with a coiled body portion surrounding pivot rod 468 between end bell mounting ears 134. Spring 478 has opposed ends 479a and 479b respectively reacting against rib portion 206 of housing half 174 and biasingly engaging motor 50 to gently urge motor 50, when not running, in a counterclockwise direction as viewed from FIGURE 8.

With continued reference to FIGURE 9, motor pulley 464 is formed as a one-piece die cast structure of lightweight high heat conductive material such as aluminum or aluminum alloy. Pulley 464 is provided with an upper annular cone 482 of enlarged diameter, an intermediate annular cone 484 of somewhat smaller diameter, and a lower annular cone 486 of smaller diameter than cones 482 and 484. Cone 484 is formed integrally at the lower end of an elongated tubular hub extension 488 which coaxially projects upwardly through cones 482 and 484. Hub extension 488 terminates in a tapered end portion 490 extending outwardly beyond the upper end face of cone 482. Radially extending from end portion 490 are a plurality of flat sided equiangularly spaced apart centrifugal fan blades 492 which are disposed above and radially beyond cone 482. Blades 492 are provided with integral axially extending radially inwardly stepped extensions 493 which rigidly and integrally join cones 482 and 484 to hub extension 488. Thus, it is apparent that the foregoing die cast construction provides for a combined stepped-cone pulley and centrifugal fan structure.

As shown in FIGURE 9, cones 482, 484, 486, 450, 452 and 454 are formed with multiple peripheral belt engaging grooves. These multiple groove pulleys 464 and 446 cooperate with belt 462 which is of the type known as a Poly-V belt, one form of which may be purchased from a manufacturer to be hereinafter mentioned in connection with the description of jointer 49. The Poly-V belt 462 provides a highly efficient transmission, being appreciably thinner than a conventional multiple V-belt. Belt 462 is internally reinforced in a manner as will be described in connection with jointer 49. Belt 462 is resultingly of equal strength in comparison to the strength of thicker V-belts but is much thinner, thus requiring much less absorption of energy in its bending about the pulleys.

With further reference to the efficient delivery of motor power from the motor shaft to a driven shaft, as in the drill press, or tool arbor, as in the jointer hereinafter described, the present invention augments the Poly-V belt drive advantages by provision of a nonslipping belt drive arrangement. This is accomplished by locating the pivot mount for the motor 50 in a specific relative position to the axis of driven shaft 424, namely, parallel thereto and in an area delimited at one side by a plane defined by the axis of the motor rotor shaft 56 and the axis of driven shaft 424 and a second plane containing the outer face of the power transmitting or tension run of the drive belts. Such a pivotal relationship, disposes the motor rotor shaft 58 at the free end of a movable pivot arm. As a consequence, the motor is free to move toward or away from the shaft 424 as the static and operational forces dictate. Since the pivot 468 as well as the motor rotor shaft 58 and driven shaft 424 all are disposed vertically in the drill press, the static forces are negligible and operational forces only need be considered. The principal and only important operational force is that engendered by rotation of the motor rotor shaft 58. Assuming the motor rotor shaft 58 rotates clockwise as viewed in FIGURE 8, the initial tendency is for the motor shaft pulley 464 to roll up the run 500 of the belt toward the shaft 424 stressing the belt run 500 and rotating the shaft 424 in a clockwise direction. In other words, the reaction forces to counterclockwise rotation of the motor rotor shaft are such that a shortening or tightening of belt run 500 occurs stressing the belt run 500 in a direction to drive the pulley of shaft 424 more strongly as the load on shaft 424 increases, as a matter of fact in a proportional ratio to the power required to drive the working element through or into the workpiece. This pivot relationship, therefore, assures that effective tensioning of the belt in proportion to the work load and a non-slipping drive connection will be provided at all times but only to the extent necessitated by the work load. In other words, continuous tensioning of the pulley belt by self powered tension means, except for a light spring bias to initiate belt driving in a vertical pivot arrangement, weights or the like and the incident high bearing loads are avoided along with all related disadvantages.

With continued reference to FIGURES 8 and 9, the respectively mating pulley housing cavities 230 receiving pulleys 446 and 464 are enclosed by a one-piece cover guard 502 which is formed as a die cast structure of lightweight high heat conductive metal such as aluminum or aluminum alloy. Cover guard 502 is provided with a peripheral downwardly extending flange 503 substantially encircling the open top of housing 170 and terminating in a downwardly facing edge matingly engageable with the upwardly facing edges 184 and 186 on housing halves 172 and 174. As shown in FIGURES 7 and 9, cover guard 502 is hinged to housing 170 by means of assembly 250 which includes a pair of hinge bearing spacers 504 mounted on the shank of a bolt 506, one on each side of housing 170. One of the spacers 504 is axially confined between housing 170 and a nut 508 threaded on bolt 506 shown in FIGURES 6 and 7 to a generally upright position.

With continued reference to FIGURES 6, 7 and 9, cover guard 502 is provided with a dome portion 510 projecting upwardly from a top wall section 512 which is bowed upwardly above spindle pulley 446 at the forward end of housing 170. Dome portion 510 is provided with an imperforate top wall 514 and an annular air discharge nozzle 516 extending between wall section 512 and dome wall 514. Annular nozzle 516 is formed by a plurality of spaced apart upstanding stationary guide vanes 518 joining the dome top wall 514 with cover guard wall section 512. Vanes 518 are angled to diffuse and distribute the air passing through nozzle 516. By effective diffusion of the air as accomplished by vanes 518, the discharging air stream velocity is appreciably reduced to eliminate discomfort to an operator standing near the drill press. The vanes 518 are formed so that the channels formed between adjacent vanes are of increasing cross-section in a direction from the interior to the exterior of the cover guard. It has been found that this configuration minimizes the re-circulation of air within the cover and improves the flow of air from inside the cover to the outside thereby providing for additional cooling action on the motor.

To axially lock quill 288 in a selected position, a locking lever 524 is provided with a handle portion 525 and a threaded shank portion 526. Shank portion 526 rotatably extends through aligned bores indicated at 527 and formed in ears 528 and 529 along an axis extending normal to the spindle rotational axis. Ears 528 and 529 are respectively formed integral with housing halves 172 and 174 adjacent to the spaced longitudinal edges 188 and 190. The threaded portion of shank 526 extends beyond ear 529 and receives a nut 530. Due to the thinness of the housing walls and the inherent flexibility of aluminum or like metals having reduced thickness, the portions of housing halves 172 and 174 adjacent to the longitudinal space 191 may be drawn together by threading the shank portion 526 of lever 524 into nut 530. Since collar portions 204 and 205 are located adjacent to and inwardly of edges 188 and 190, they fixedly clamp quill 288 by drawing the lower forwardly extending portions of housing halves 172 and 174 together in the manner described. The space 191 enables the lower forwardly extending portions of housing halves 172 and 174 to be drawn together sufficiently to clamp quill 288 in a selected position.

As a result of foregoing locking quill clamp structure cooperating with the housing halves 172 and 174, it is apparent that quill 288 may be clamped axially in place when pinion 342 is disengaged from rack 300 to permit adjustment in the tension of spring 388.

The drill press housing and air ventilating construction as described herein provides for a strong and effective circulation of air through housing 170 to rapidly carry away operational heat. Ventilating air is drawn upwardly through the open bottom of housing 170 by motor fan 66 and by motor pulley fan 492. This incoming air passes upwardly through end bell 58 in the same manner previously described and also around motor 50 and around the quill and spindle assembly. The upward currents of air circulate through the motor housing cavities 222 and also through quill and spindle housing cavities 200 and 242 due to the spaced apart relation of ribs 206 as previously described. These strong air currents intimately wipe all operational parts of the drill press in housing 170, thus rapidly removing and carrying off the operational heat. The aperatures in spindle pulley 446 assures for effective air flow through the quill and spindle housing cavities 200 and 242 to assist in preventing the development of dead air pockets around the spindle drive sleeve and spindle bearing parts. The ventilating air is drawn into the pulley housing cavities by motor pulley fan 492 which creates a low pressure area in the proximity of the center of motor end bell 60. Since fan 492 has an appreciably larger diameter and capacity than the motor fan 68 in end bell 60, ventilating air will be drawn upwardly through the axial ventilating opening 112 of end bell 60 thus rendering motor fan 68 substantially ineffective to produce the air flow pattern described in the operation of fan 66 disposed in the lower end bell 58, but effective as an agitator to effect a scrubbing of the motor parts by the reversed air flow through end bell 60.

As a matter of manufacturing expediency, due to the die casting of motor parts as previously described, motor fan 68 in the upper end bell 60 is not removed but is left in the motor assembly utilized in the drill press. However, as air flow induced by fan 492 is in opposition to motor fan 68, fan 68 creates turbulence thereby assisting cooling. This motor fan 68 incorporated in the motor assembly is required to provide air circulation in the circular saw 48 where motor fan 68 acts as an air circulating fan in the same manner as fan 66 to induce a centrifugal flow across the exposed faces of the motor stator and rotor and in intimate wiping contact with end bell 60 and the operational parts.

Ventilating air drawn upwardly into the pulley housing cavities of housing 170 is expelled by fan 492 through the annular discharge nozzle 516 in cover guard 502. Due to the capacity of fan 492, the fan discharge air velocity is relatively high but the air guide vanes 518, as previously described, effectively diffuse the air being discharged through nozzle 516 to reduce the air velocity by such a magnitude that air discharging from nozzle 516 is not objectionable to a person in the proximity of the drill press. In addition to carrying off operational heat, the air circulation, in wiping the interior of housing 170, enables heat to be transferred to housing halves 172 and 174 which have appreciably large radiating surfaces. Operational heat also is transferred to housing 170 by direct conduction through the heat path formed by the pivot ear mounting structure previously described where the end bell ears 134 intimately abut the ears on housing half 172.

As a result of the size reductions made possible by the small casingless motor and the design of the housing and operating parts of the drill press of this invention, a drill press delivering a power output equivalent to present day commercial home workshop drill presses is provided having a throat dimension (spindle to column) five and one-sixteenth inches, spindle to table of six and one-half inches, a spindle travel of three inches, an overall width of eight inches, an overall height (fully extended along the column) of twenty-five and three-eighths inches and an overall depth (at the base) of eleven and three-eighth inches. Pulley speeds of 800, 1750 and 4000 r.p.m. are available as a result of the stepped pulleys. While these work capacity dimensions compare favorably with existing comparable commercial drill presses, the tool complete is sufficiently light in weight to be unit packaged for over-the-counter department store selling greatly increasing the marketability of such power tools.

With the foregoing reduced-sized lightweight drill press construction, it is apparent that the press may be easily hand carried from one location to another and set in place for bench operation at a location most convenient to the operator, thus eliminating such problems as transferring work material to and from a permanent drill press location.

In addition to the foregoing features it is apparent that the drill press head assembly is readily adapted for usage as a hand drill. The drill press head assembly, as previously described, incorporates housing 170, motor 50 mounted in housing 170 and the quill and spindle assembly which is also mounted in housing 170. This drill press head assembly has a weight value on the order of 15 pounds, due to the construction of component parts as previously described, and is removed from support column 160 as a single unit simply by the two loosening column clamping bolt and nut assemblies 272 and 274 as previously explained. With the lightweight, reduced size drill press head construction and its ready removability from support column 160, it is apparent, therefore, that the drill press head assembly may be conveniently utilized as a hand drill in addition to its bench setting usage.

CIRCULAR SAW

Turning now to FIGURE 26a, the tilting arbor saw 48 referred to above comprises, generally, a housing 550 on the upper end of which is mounted a saw table 552, a motor 50a, similar to the motor 50 described above, a circular saw blade 556 rotatively fixed to the motor output shaft 56a, and a tilt-pivot assembly 558 suspending motor 50a from saw table 552 and arranged to permit angular and elevational adjustment of the saw blade. Tilting arbor saw 48 may be provided with the conventional accessories including a miter gauge 559 and a rip fence 560.

Housing 550, as may be seen from FIGURE 30, is of a lightweight, novel sheet metal construction, wholly unlike the conventional heavy cast iron base generally employed. The housing has a hollow, substantially open top, back and bottom, a boxlike configuration, and is preferably fabricated from 20 gauge sheet steel although other suitable materials may, of course, be employed.

The upper edge portions of the four vertical side walls 562 of the housing are turned or bent inwardly to provide horizontal mounting flanges 564 to which saw table 552 is fastened by bolts 566 and lock washers 568. Mounting flange 564 extends along the front and both sides of housing 550 but, on the back side, terminates a short distance from the intersections of the back and the two side walls. The left-hand side of housing 550 is provided with a vertically oriented U-shaped slot 567 through which motor 50a extends. An outwardly extending enlargement 569 on the right hand side of housing 550 provides a recess which receives the lower portion of saw blade 556 when the latter is tilted to make a thin bevel cut. As is best shown in FIGURE 30, a transversely extending strap or stiffener 570 extends between and is fastened to the oppositely disposed wall portions of rear wall 562, further strengthening and utilizing housing 550.

Saw table 552, which is preferably of one-piece die-cast aluminum construction, has a large area, thin section portion 571 defining a flat, horizontal work surface 572, integral depending ribs such as 574 and 575 (see FIGURE 29) and a peripheral rim 576, the ribs and rim serving to strengthen and rigidify the table. Spaced apart, depending integral lugs 578, 579 and 580 are provided intermediate the lateral edges of the table for suspending tilt-pivot assembly 558.

The thin section, work surface defining portion 571 of the saw table is provided with a longitudinally extending slot or window 582 (see FIGURE 27a) through which saw blade 556 extends. The major portion of this window is normally covered by a table insert 584 which is disposed in a recess 585 adjacent the right-hand periphery of window 582 so that its top surface is flush with work surface 572 and secured to the table by screws 586 (only one of which is shown). Table insert 584 may be removed when it is desired to gain access to the output shaft 56a of motor 50a (which, as will become apparent, comprises the arbor on which saw blade 556 is mounted) to remove or install the saw blade.

Saw table 552 is also provided with conventional longitudinally extending grooves 588 and 590 for receiving and guiding miter gauge 559. A laterally extending, rectangularly sectioned bar 592 is attached to spaced apart integral lugs 594 formed on the table rim at the front side of saw table 552 by machine screws 596 which are threaded into tapped apertures 598 in the integral lugs 594 (see FIGURE 29). Bar 592 mounts rip fence 560 for laterally adjustable movement in the conventional manner.

Assembly 558, referred to above, consists of a flat-bottomed, substantially U-shaped, die-cast, aluminum, angle bracket 602, attached by machine screws 604 to the lugs 578, 579 and 580 depending from saw table 552 and a bevel control mounting member 606 pivotally mounted on angle bracket 602.

Figure 27A:
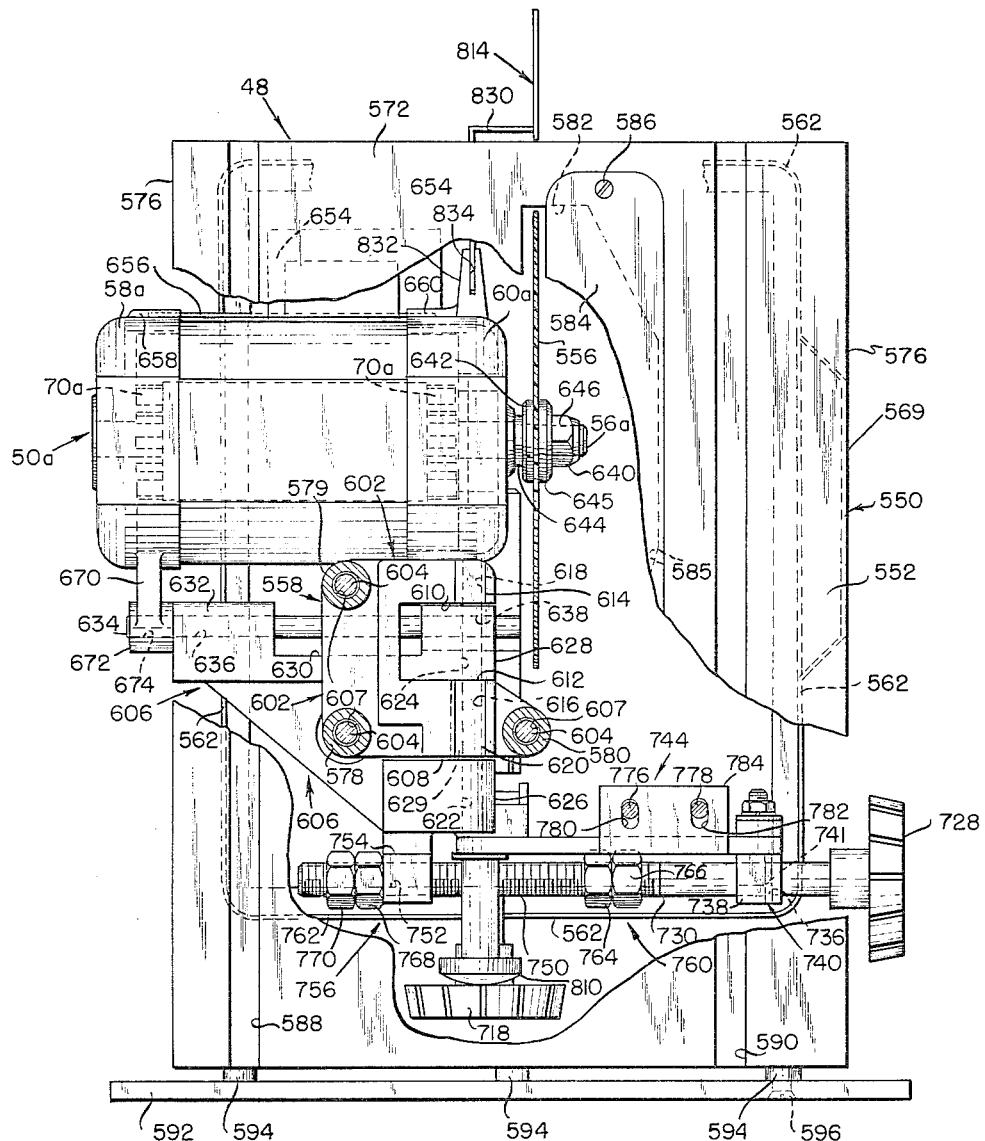

The aperture 607 in angle bracket 602 through which machine screws 604 extend are purposely oversize (see FIGURE 27a). In this manner, angle bracket 602 may be rotated or twisted with respect to the longitudinal axis of the table. This permits saw blade 556 (which is mounted on the shaft of motor 50a which, in turn, is suspended from angle bracket 602 by bevel control mounting bracket 606) to be quickly and accurately aligned parallel to the miter gauge slots 588 and 590 so that it will not bind in the material being sawed.

Adjacent the ends of the legs 608 and 610 of angle bracket 602 are integrally formed upwardly extending bosses 612 and 614. Axially aligned apertures 616 and 618 in bosses 610 and 614 receive an angle hinge pin 620.

The axis of hinge pin 620 is located so that, when saw blade 556 is tilted to produce a bevel cut, it will rotate about the line of intersection between the plane of the saw blade and the plane of work surface 572. This is a conventional arrangement, the theory of which is developed in United States Patent No. 1,324,136 issued to R. S. E. Turner. A typical example of the application of Turner's invention to a tilting arbor saw is found in United States Patent No. 2,008,673 issued to W. T. Ocenasek.

Bevel control mounting member 606, as may be seen from FIGURE 27a, is a generally L-shaped member that is die-cast preferably from aluminum or a similar lightweight high heat conductive metal. Mounting member 606 is mounted for lateral tilting movement on angle hinge pin 620 which extends through axially aligned apertures 622 and 624 in spaced apart upwardly and then angularly extending integral pivot arms 626 and 628 connected by an integral flange 629. It will be noted that pivot arms 626 and 628 closely surround boss 612 on angle bracket 602, preventing bevel control mounting member 606 from shifting on angle hinge pin 620. At the lower end of the angularly extending portion of pivot arm 628, an integral vertical flange 630 extends transversely, terminating in a rearwardly directed, vertically extending projection 632. An elevating hinge pin 634, as is best shown in FIGURE 27a, extends transversely of the saw through axially aligned apertures 636 in projections 632 and 638 in the vertically extending portion of pivot arm 628.

Motor 50a is pivotally mounted on elevating hinge pin 634 by end bells 58a and 60a which are similar to end bells 58 and 60 with certain exceptions which will be pointed out somewhat later. The motor output shaft 56a, which is substantially identical to output shaft 56, terminates, at its right-hand end, in a threaded portion 640. Shaft 56a is the arbor of saw blade 556 which is secured against a shaft collar 642, axially fixed on the shaft against a shoulder 644, by a saw collar 645 and a motor shaft nut 646.

An important feature of the novel tilting arbor saw provided by the present invention is the novel arrangement for dissipating from motor 50a the heat generated by its operation. To this end, both of the end bells 58a and 60a are formed with conical baffles 146a (see FIGURE 33) identical to the baffles 146 illustrated in FIGURE 5 and described in conjunction with end bell 58. As do baffles 146, baffles 146a channel the inflowing motor-cooling air, thus providing a more definite flow pattern and, therefore, more efficient distribution of the cooling air.

Unlike the drill press 47 described above and the jointer 49 to be described later, the tilting arbor saw 48 is not provided with an air circulating fan in addition to the low capacity fans (70a identical to the above-described fan 70) formed on the rotor of motor 50a. It has been found that, because of the more efficient distribution of cooling air resulting from the provision of baffles 146a and a novel arrangement for conducting heat away from motor 50a and dissipating it from saw table 552, the additional fan is unnecessary.

As may be seen from FIGURE 27a when saw blade 556 is in its maximum depth of cut position, end bells 58a and 60a have a large area engagement with the bottom side of the saw table. Since both the end bells and the saw table are fabricated of aluminum, a metal having extremely high conductivity, heat transferred to the end bells by the passage of cooling air through them is rapidly conducted away from the motor to the table which, having a large radiating surface, as quickly radiates the heat into the surrounding atmosphere.

In addition, a substantial portion of the motor-generated heat is conducted away from end bells 58a and 60a through their integral flange and arm portions to the bevel control mounting member 606 which, in turn, conducts the heat through the angle plate 602 to saw table 552 where it is dissipated. In this respect, it should be noted that the end bells, bevel control mounting member 606, and angle plate 602 are all fabricated preferably of highly conductive aluminum and further, that all of these members have large surface areas. Consequently, each of these members, as well as saw table 552, is an effective radiator of heat.

Moreover, saw blade 556, as it revolves, generates local air currents which, sweeping over end bells 58 and 60 and the stator motor 50, carry away a substantial amount of heat. It is apparent then, that the above arrangement provides a highly effective combination of convective and conductive heat transfer which efficiently dissipates the heat generated by motor 50.

It has further been discovered, surprisingly, that the cooling efficiency decreases only an insignificant amount when saw blade 556 is lowered to a less than maximum depth of cut position and the flat surface portions of end bells 58a and 60a are no longer in contact with saw table 552. In this case, a channel or passage is formed between the end bells 58a and 60a and the under surface of table 552. The convection currents generated by the rotation of saw blade 556 sweep through this passage carrying away heat radiated from the end bells and the stator of the motor, particularly at the lesser work load positions of the saw blade.

Another novel feature of the tilting arbor saw provided by the present invention is the arrangement for mounting relay 648 and capacitor 650 on motor 50a. As may be seen from FIGURE 29, relay 648 and capacitor 650 are mounted in a housing 652, preferably fabricated from nylon or a similar nonconductive material, which is contoured to fit against the stator of motor 50a. The side walls 654 of housing 652 are provided with aligned notches (not illustrated) through which extend a fastening strap 656.

Referring next to FIGURES 29 and 34, end bells 58a and 60a are dished out to provide recesses 658 and 660, respectively, between the end bells and the stator of motor 50a. The ends of strap 656 extend into the recesses whereby the surrounding portions of the end bells secure the strap—and, therefore, housing 652—in its position against the stator.

End bell 58a is identical to the end bell 58 described above with the exception that end bell 58a is provided with an integral flange 670 terminating in an enlarged boss 672. Elevating hinge pin 634 extends through an aperature 674 in enlarged boss 672, the aperture being dimensioned to allow free pivotal movement of end bell 58a and therefore, motor 50a, about pin 634.

End bell 60a, best shown in FIGURE 34, is similar to the end bell 60, as was mentioned above, but has certain added structure as follows in addition to the conical baffle 146a. Adjacent its outer end, bell 60a is provided with a forwardly extending integral arm 675 pivotally mounted on elevating hinge pin 634 which extends through an aperture 676 adjacent the upper edge of the arm. An integral, forwardly and upwardly directed extension of the arm serves as a locking leg 680 which comprises part of a novel arrangement for locking the saw blade 556 at the desired elevation and tilt angle and which will be explained presently in some detail.

Saw blade 556 is raised by pivoting the unitary assembly of saw motor 50a, saw arbor 56a, saw blade 556, and end bells 58a and 60a in a counterclockwise direction about elevating hinge pin 634 and is lowered by pivoting the assembly in the reverse or clockwise direction. To accomplish the pivoting movement, end bell 60a is provided with a second integral arm 682 which extends downwardly from the bell and is provided, at its lower end, with an aperture 684. (See FIGURE 32.)

Figure 35:
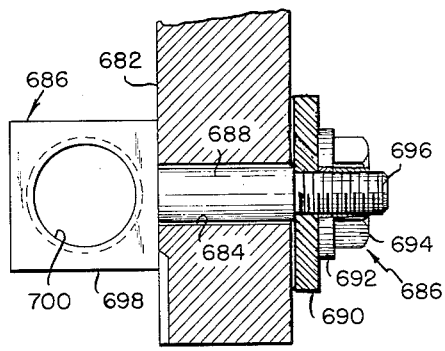
FIGURE 35 is a view, to an enlarged scale, of a control nut employed on the saw.

As is shown in FIGURE 35, a control nut 686, which has a cylindrical shank 688 extending through oversized aperture 684, is secured in place by a flat washer 690, a lock washer 692, and a nut 694, threaded onto a reduced diameter extension 696 of the shank. It will be noted that shank 688 is so dimensioned, that, when control nut head 698 is abutted against the forwardly directed side surface of arm 682, shank 688 extends outwardly past the opposite control arm side surface. Thus, when nut 694 is tightened, flat washer 690 will engage the annular surface of the end of shank 688, providing clearance between it and arm 682. As a consequence, control nut 686 is free to rotate in aperture 684.

The control nut 686 is provided with a threaded aperture 700 through which extends a threaded elevating screw 702. Elevating screw 702 extends forwardly (see FIGURE 29) through a control sleeve 704 and an arcuate slot 706 in the front wall 562 of housing 550 (see FIGURE 30). Control sleeve 704, which is mounted at the lower end of a downwardly directed extension 710 of bevel control mounting member 606, is constructed in the same manner as control nut 686 except that a bore corresponding to aperture 700 is not threaded but is smooth, shaft 702 being restrained axially by a cross pin 703 through sleeve 704 cooperating with a groove in shaft 702 and, like that member, may rotate freely with respect to the member on which it is mounted.

The novel double-pivot mounting of elevating screw 702, described above, permits the screw to pivot with respect to end bell 60a and bevel control mounting member 606 as saw blade 556 is raised and lowered.

To move saw blade 556 upwardly to increase the depth of cut (or downwardly to decrease the depth of cut) elevating thread 702 is rotated by a preferably die-cast aluminum control knob 718 rotatively fixed to its forward end by a setscrew 720. Since the elevating screw is prevented from moving axially by the cross pin 703 cooperating with a groove in elevating screw 702, this rotational movement causes the threaded elevating screw, engaging the threads in threaded aperture 700 of control nut 686, to drive the control nut along the screw to move end bell 60a—and, therefore motor 50a and saw blade 556—in a counterclockwise direction about elevating hinge pin 634, for example, raising the saw blade 556 with respect to the work-supporting surface 572 of saw table 550.

Another important feature of this invention is the novel limit stop 722, provided for arresting the clockwise movement of end bell 60a when the saw blade 556 reaches its uppermost or maximum depth of cut position. In this respect, it is to be noted that, when saw blade 556 is raised to the maximum depth of cut position, the flattened tops of end bells 58a and 60a abut the underside of saw table 550. If, at this point, continued counterclockwise torque were exerted on end bell 60a, which can rotate no further, extension 682 of end bell 60a could conceivably be broken off. It is the function of limit stop 722 to prevent continued rotation of elevating screw 702 after saw blade 556 reaches its maximum elevation so that the undue stresses, described above, cannot be imparted to end bell extension 682.

Limit stop 722 consists of a pair of lock nuts 724 and 726 threaded onto the rear end of elevating screw 702. Lock nuts 724 and 726 are so positioned that, when saw blade 556 reaches its uppermost position, the forward nut 724 will engage and bind against the enlarged head 698 of control nut 686, preventing further rotation of elevating screw 702.

The retraction of saw blade 556 from its maximum depth of cut position is caused by rotating control knob 718 to pivot end bell 60a in a clockwise direction about elevating hinge pin 634. This retraction of the saw blade is limited by the engagement of the enlarged head 698 of control nut 686 with the rear edge of the depending arm of extension 710 of end bell 60a. This position of control nut 686 is shown in phantom outline in FIGURE 29.

Saw blade 556 is tilted to produce a bevel cut by rotating a control knob 728 positioned on the right-hand side of the tilting arbor saw 48. Control knob 728 is attached to the end of an angle adjusting screw 730 by a set screw 732 (see FIGURE 28). Angle adjusting screw 730 extends to the left through an aperture 734 in the right-hand side wall 562 of housing 550, and through an axial bore 736 drilled in the enlarged head 738 of a control sleeve 740. Control sleeve 740, which is mounted on the lower end of a depending arm 742 of a locking bracket 744, is identical with the control sleeve 704, described above and permits angle adjusting screw 730 to pivot with respect to locking bracket 744 as saw blade 556 is tilted from the vertical or 90° position. Cross pin 741 through sleeve 740 cooperating with a groove in adjusting screw 730 prevents it from moving axially with respect to locking bracket 744 which is an integral die-cast structure of lightweight high heat conductive metal such as aluminum.

A threaded portion 750 of angle adjusting screw 730 extends through a threaded bore 752 in the enlarged head 754 of a control nut 756. Control nut 756, which is identical with the control nut 686 described above and illustrated in FIGURE 35, is mounted on the depending integral leg 710 of bevel control mounting member 606. Control nut 756 travels along angle adjusting screw 730 as the latter is rotated, pivoting bevel control mounting member 606 about angle hinge pin 620. In addition, the construction of control nut 756 permits angle adjusting screw 730 to pivot with respect to the bevel control mounting member as the latter pivots about the hinge pin. This double-pivot mounting of angle adjusting screw 730 prevents that member from binding as the bevel control mounting member is rotated.

To produce a bevel cut then, control knob 728 is rotated thereby rotating angle adjusting screw 730 and causing control nut 756 to travel toward the front of the saw along the threaded portion 750 of control nut 730. As control nut 756 moves forward, it pivots bevel control mounting bracket 606 in a counterclockwise direction about angle hinge pin 620, tilting saw blade 556 from the full line (90°) position of FIGURE 28 toward the 45° position shown in phantom outline in the same figure. It is to be noted that, since elevating screw 702 is mounted only on extension 682 of end bell 60a and extension 758 of bevel control mounting member 606 and since both of these members pivot together (end bell 60a being suspended solely from member 606), tilting of saw blade 556 will not be impeded by elevating screw 702 which will merely move in an arcuate path as the blade is tilted. And, as was pointed out above, the front wall 562 of saw housing 550 is provided with an arcuate slot 706 to accommodate this arcuate movement of the elevating screw.

Pivotal movement of the bevel control mounting member 606 is limited between the 90° and 45° positions (shown in full and dotted lines in FIGURE 28) of saw blade 556 by limit stops 760 and 762, respectively. Limit stops 760 and 762 are similar to limit stop 722 and function in like manner. Limit stop 760 consists of a pair of lock nuts 764 and 766 threaded on angle adjusting screw 730 between control nut 756 and control sleeve 740. Similarly, limit stop 762 comprises a pair of lock nuts 768 and 770 threaded on angle adjusting screw 730 between control nut 756 and the rear end of the screw.

When it is desired to tilt saw blade 556 from the 90° position to the 45° position, as was discussed above, control knob 728 is rotated clockwise causing control nut 756 to travel forwardly along the threaded portion 740 of angle adjusting screw 730, thereby pivoting bevel control mounting bracket 606, saw motor 50a, and saw blade 556 in a counterclockwise direction about angle hinge pin 620. When saw blade 556 reaches the 45° position, control nut 756 will engage—and bind against—the lock nut 764 of limit stop 760, preventing further movement of the control nut and precluding the possibility that undue stress might be placed on depending leg 758 of bevel control mounting member 606. In a like manner, when control knob 728 is rotated in a counterclockwise direction, control nut 756 will travel to the rear along the threaded portion 740 of angle adjusting screw 730, tilting saw blade 556 from the 45° position toward the 90° position. When saw blade 556 reaches the 90° position, control nut 756 will engage and bind lock nut 768 of limit stop 762, preventing further counterclockwise rotation of elevating screw 730, again eliminating the possibility of undue stress being placed on the depending leg 758 of the bevel control mounting member.

The locking bracket 744, referred to above, is attached to mounting pads 772 and 774 integrally formed on the bottom of saw table 552 by machine screws 776 and 778. As is shown in FIGURE 27a, machine screws 776 and 778 extend upwardly through elongated slots 780 and 782 in a horizontal flange 784 of the bracket. This arrangement allows the bracket to be precisely aligned when the saw 48 is assembled.

Figure 28:
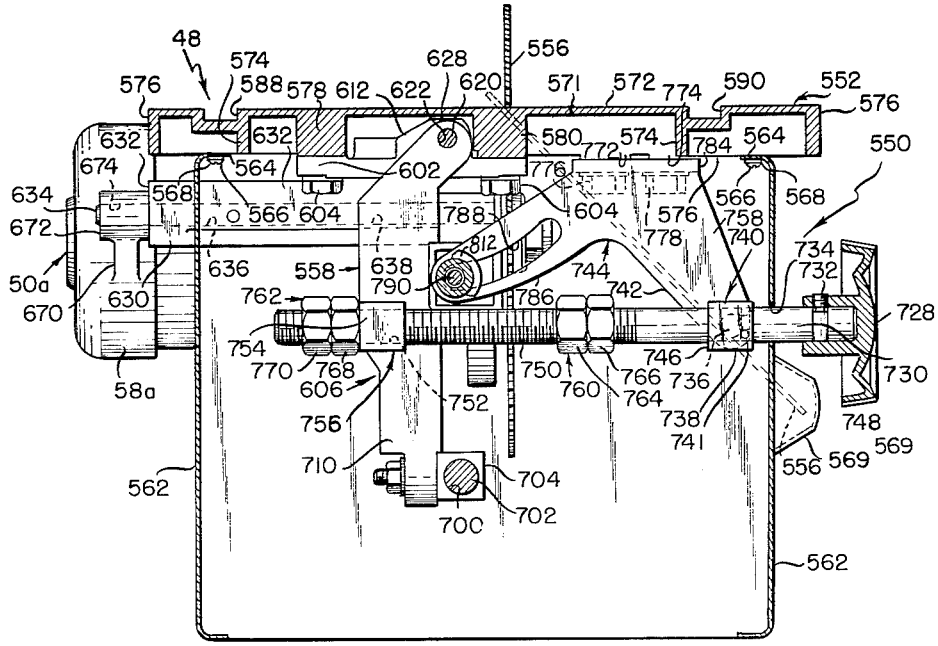

Referring next especially to FIGURE 28, locking bracket 744 is provided with a downwardly directed extension 786 in which is formed an elongated arcuate aperture 788. Extending forwardly through arcuate aperture 788 and a coextensive arcuate opening 789 in front wall 562 of housing 550 (See FIGURE 30) is a square-headed locking bolt 790. The head 792 of locking bolt 790 is engaged by a locking wedge 793 (See FIGURES 29, 34 and 37) journalled on the bolt which extends through a bolt-receiving bore 794 in the wedge. Locking wedge 792 has a convex face portion 796 (FIGURE 37) which rides along the upper surface of a horizontal skew-like track or flange 798 formed on the lower edge of locking leg 680 of end bell 60a.

As locking wedge 792 slides along flange 798, it is prevented from rotating by the sliding engagement of the side surface 800 of the locking wedge and the left-hand vertical surface 802 of locking leg 680. This arrangement is an important feature of the present invention because locking wedge 792 is fabricated from a metal substantially harder than the relatively soft aluminum from which end bell 60a is cast. Therefore, if the locking wedge were permitted to rotate as it slides along flange 798, its edge would tend to dig into and damage the locking leg 680.

Figure 37:
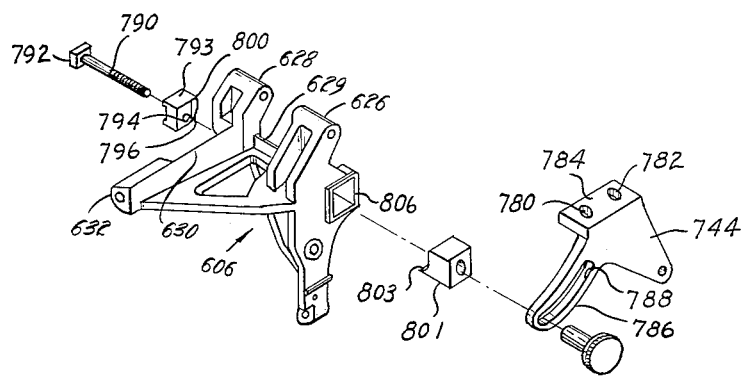
FIGURE 37 is a perspective view of the bevel control mounting member employed in the saw.

Also journalled on the locking bolt 790—on the opposite side of locking leg 680 from wedge 792—is a locking sleeve 801. As is best shown in FIGURES 29 and 37, locking sleeve 801 has a concave face 803 with the same radius of curvature as the bottom edge 804 of locking leg 680 so that the locking leg may slide smoothly across this face.

As is shown in FIGURE 29, locking sleeve 801 extends through a hollow projection 806 integrally formed on the side of bevel control mounting member 606 into abutting relationship with the rear side of locking bracket 744. Although projection 806 has been illustrated with a square aperture, it is to be understood that this particular configuration is not essential. It is only necessary that the particular configuration selected prevents the relatively hard locking sleeve 801 from rotating about locking bolt 790 and digging into the relatively soft aluminum from which locking arm 680 of end bell 60a is cast.

The forward end of locking nut 790 is threaded into a drilled and tapped aperture 808 in a locking knob 810 which abuts a washer 812 mounted on bolt 890 adjacent the front side of locking bracket 744. As is best shown in FIGURE 29, locking knob 810 extends forwardly from saw housing 552 to a point where it may be easily manipulated by the operator.

The above-described components provide a novel double-locking arrangement, locking saw blade 556 at both the desired depth of cut and the desired tilt angle. To elaborate, when locking knob 810 is rotated in a clockwise (tightening) direction, locking bolt head 792, locking wedge 793, locking leg 680 of end bell 60a, locking sleeve 801, locking bracket 744, and locking knob 810 are all drawn into a tight, motion-preventing relationship. In this relationship, the frictional forces between (1) locking leg 680 and (2) locking wedge 793 and locking sleeve 801, prevent end bell 60a from rotating about elevating hinge pin 634, thus maintaining saw blade 556 in the position furnishing the desired depth of cut. Similarly the frictional forces between locking sleeve 801 and locking bracket 744, locking bracket 744 and washer 812, and washer 812 and locking knob 810, prevent locking bolt 790 from moving along the arcuate slot 788 in mounting bracket 744. This, therefore, prevents movement of locking sleeve 801 (which, it will be remembered is journalled on locking bolt 790) and tilting movement of bevel control mounting member 606, an integral portion 806 of which, as was explained above, surrounds the locking sleeve.

Conversely, by rotating locking knob 810 in a counterclockwise direction, these grip-forces are released and, consequently, the depth and angle of cut of saw blade 556 may be altered by manipulation of control knobs 718 and 728.

Another important feature of the present invention is the novel splitter 814 best shown in FIGURES 29 and 36. As may be seen from these figures, splitter 814 is a unitary member having a first portion 816 extending below saw table 552 and a second portion 818 extending above the table. The lower portion 816 of splitter 814 has, at its upper end, an integrally formed, hollow, bolt-receiving flange 820. Referring now particularly to FIGURE 29, splitter 814 is pivotally mounted on a machine screw 822 which extends through aligned apertures 824 and 826 in, respectively, peripheral rim 576 and one of the depending ribs 575 of saw table 552. Machine screw 822, which is located in axial alignment with angle hinge pin 620, is secured in place by a nut 828 and a lock washer 830.

With continued reference to FIGURE 29, a rearwardly extending flange 832 integrally formed on end bell 60a is provided with a rearwardly opening slot 834 intermediate its side surfaces into which the lower portion 816 of splitter 814 extends (see FIGURE 27). Therefore, as saw blade 556 is tilted by the manipulation of the control knob 728, splitter 814 will be tilted to the same extent so that its upper portion 818 will remain in the same plane as saw blade 556.

It will be noted that the lower portion 816 of splitter 814 extends well below the level of saw table 552. This is necessary so that, when saw blade 556 is retracted to its lowest position, the integral flange 832 on end bell 60a will remain in engagement with the splitter.

The upper and lower portions 816 and 818 of splitter 814 are connected by a transversely extending, integral connecting portion 836, so dimensioned that, when saw blade 556 is in the vertical or 90° position, the upper portion 818 of splitter 814 is aligned in the same vertical plane as the saw blade. A flange 837 bent horizontally from the lower portion 816 of splitter 814 strengthens and prevents twisting of the splitter.

A further important feature of this invention is that the splitter 814 is employed to mount the saw guard 838. Referring particularly to FIGURE 36, an upwardly and rearwardly extending slot 839 is formed in the upper portion 818 of splitter 814. A guard mounting roller 840 extends through this slot and through aligned apertures 842 in saw guard 838. The guard mounting roller 840 is secured in place by a guard mounting roll pin 843.

Guard 838 is provided with a vertically and forwardly extending slot 844 so that, in the assembled position, the rear portion of guard 838 surrounds, and may slide up and down in relation to, the upper portion 818 of splitter 814, roller 840 moving up and down in slot 839 as saw guard 838 is raised and lowered.

When a board or other material is fed into the saw blade 556, it will engage the rounded forward end portion 846 of saw guard 838, moving the guard rearwardly and upwardly in the slot 839 until a balance point is reached and the board passes under the nose of the guard 846.

As is apparent from the foregoing description of tilting arbor saw 48, a maximum number of multifunction components are employed. First, it will be noted that the end bell 60a, a single integral casting, serves a number of useful purposes. First, the integral conical baffle 146a formed thereon channels the cooling air into the motor 50a to efficiently remove the heat generated by the operation of the motor. The end bell, because of its large surface area, and its fabrication from highly heat-conductive aluminum, serves as a very efficient radiator of heat, conducting away and dissipating through radiation from its surfaces a substantial amount of the heat generated by the motor. End bell 60a, in addition, provides a flange 675 by which motor 50a is pivotally mounted for varying the depth of cut of saw blade 556. Moreover, end bell 60a includes, an integral locking bracket 680, a flange 832 for maintaining splitter 814 in the same plane as saw blade 556 when the latter is tilted to make a bevel cut, and a depending extension 682 which mounts the adjusting screw 702 employed for varying the elevation of saw blade 556.

Similarly, the bevel control mounting member 606 is a unitary aluminum die-casting performing a number of functions. First, it mounts the elevating hinge pin 634 on which the end bells 58a and 60a are pivoted to vary the depth of cut of saw 556. Also, member 606 mounts the saw for tilting movement on angle hinge pin 620. Still further, member 606 mounts both the elevating adjusting screw 702 and the angle adjusting screw 730, and a portion of the novel double-lock arrangement discussed above. Thus, it will be seen that these two members, end bell 60a and bevel control mounting member 606 together with the end bell 58a and the angle bracket 602 are the only members necessary to mount the saw motor 50a and saw blade 556 for tilting and elevational adjustment, for positioning the splitter 814, and for conducting away and dissipating the heat generated by the operation of motor 50a. Because of the novel construction and arrangement of the components described above, it has been possible to reduce the overall size of a tilting arbor circular saw, to simplify its construction and assembly, and to reduce its weight by over 30%.

Here again, the size reduction made possible by the small casingless motor and the design of the housing and operating parts makes possible a circular saw delivering a power output equivalent to present day commercial home workshop circular saws and having a depth of cut at 90° of one and eleven-sixteenths inches, a depth of cut at 45° of one and three-quarter inches, a six inch table exposure in front of the blade, a rip capacity to the center of a nine and one-quarter inch board and extendable with the normally offered table wing extensions (increasing table size from fourteen by ten and one-half inches to fourteen by twenty-four inches) to the center of a twenty and one-quarter inch board, and overall dimensions for packaging of seventeen inches depth, thirteen inches width and seventeen and one-half inches in height. Here again, these work capacity dimensions are comparable to existing competitive commercial circular saws, yet the overall dimensions and weight permit unit packaging (including the table extensions) for over the counter department store selling.

JOINTER

Figure 39:
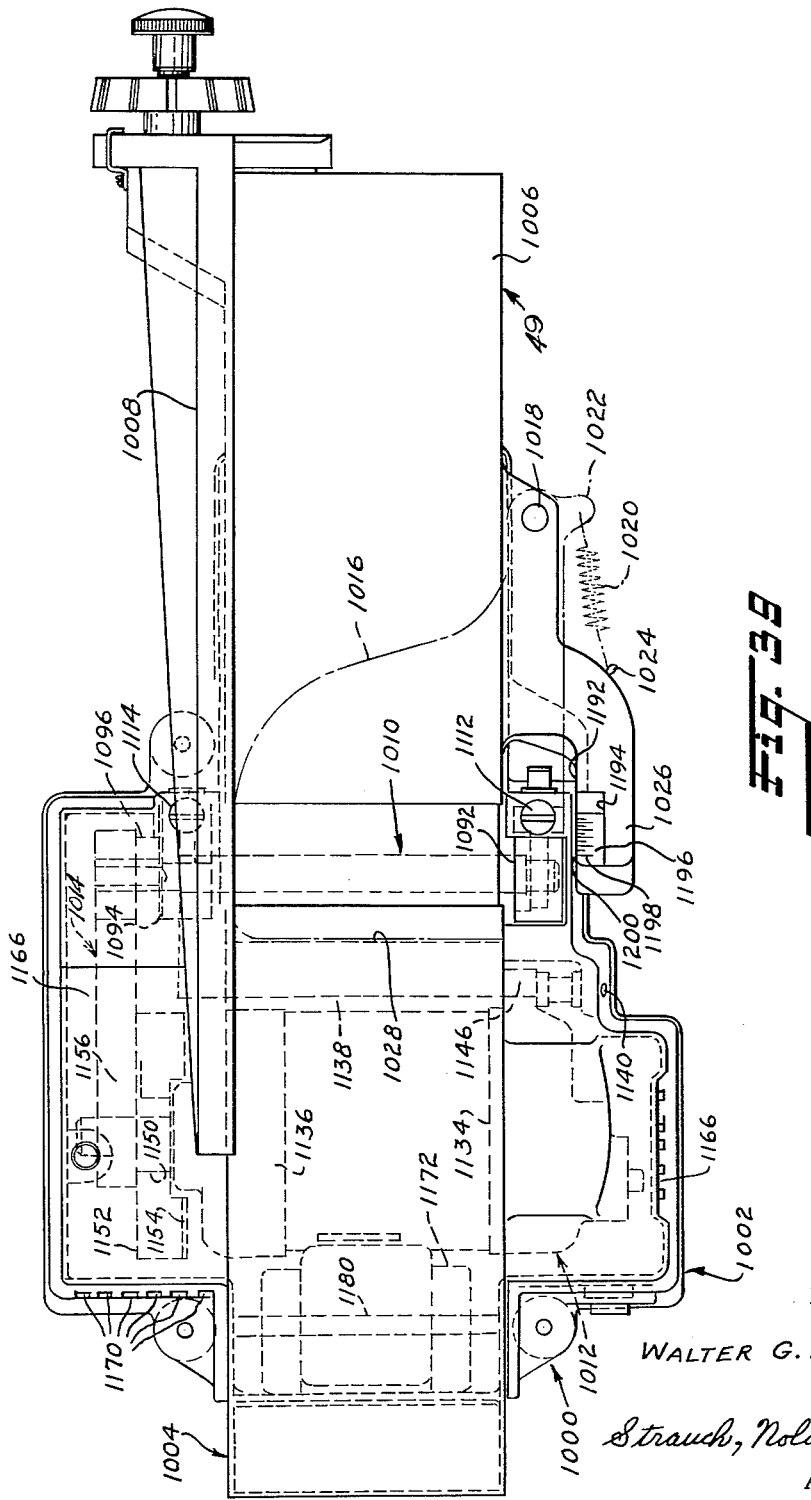
FIGURE 39 is a top plan view of the jointer embodiment of FIGURE 38.

Referring now to FIGURE 38, the jointer embodiment of the present invention comprises a die-cast member 1000 formed of aluminum or aluminum alloy providing an integral base structure 1002 and out-feed table 1004, a similarly die-cast in-feed table 1006 vertically adjustably mounted on base structure 1002 and having a work piece guide fence 1008 adjustably mounted thereon and a rotary cutter head assembly 1010 journaled upon the base structure 1002 between tables 1004 and 1006 and driven by an electrical motor 1012 through a drive belt 1014. Fence 1008 may be of any suitable conventional form and is mounted for pivotal movement about an axis extending longitudinally of tables 1004 and 1006 45° in either direction from its illustrated vertical position, as well as lateral movement across table 1006. As is best shown in FIGURE 39, a conventional cutter head guard 1016 is pivotally mounted by a shaft 1018 upon the in-feed table 1006 and resiliently biased into position over the cutter head assembly 1010 by a spring 1020 connected between the ear 1022 and integral with guard 1016 and a projecting eye connector 1024 fixed to the rabbeting arm 1026 integral with the in-feed table 1006.

The large aluminum casting 1000 forms a light-weight effective heat sink to dissipate the heat from the motor 1012. The work support surfaces of the in-feed and out-feed tables 1006 and 1004 are used substantially in their as-cast form, being finished solely by a combined light sanding and wax polishing operation. Being of aluminum, these surfaces do not rust so that the jointer may be stored in a garage or basement. If the work support surfaces of these tables become marred in use, they may be refinished merely by a light sanding operation by the owner.

Figure 43:
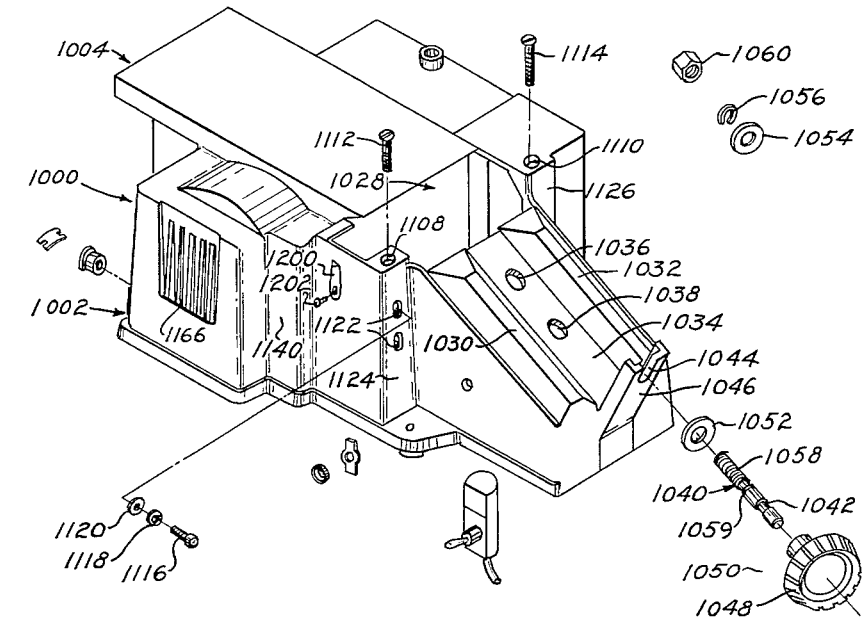
FIGURE 43 is an exploded perspective view of the base structure and associated parts of the jointer of FIGURE 38; and, FIGURE 44 is an exploded perspective view of the drive motor to cutter head drive train of the jointer of FIGURE 38.

Referring now to FIGURE 43, the member 1000 as indicated above is an integral open bottom hollow aluminum casting. In front of the integral out-feed table 1004, member 1000 is formed with a downwardly extending through opening 1028 in which the cutter head 1010 is mounted as will be explained presently. In front of opening 1028, member 1000 is formed with a downwardly sloping top surface defining the support along which the in-feed table 1006 is vertically adjustably mounted. This support comprises a pair of longitudinally elongate parallel guideways 1030 and 1032 integral with the member 1000 and spaced apart by an integral transverse wall 1034 apertured at 1036 and 1038. Guideways 1030 and 1032 are each of inverted truncated V-shaped in cross-section as is apparent from the view of the end of guideway 1030 shown in FIGURE 43 and from FIGURE 41. These guideways are precision cast and used in their as-cast form. Being of aluminum, they are not susceptible of deleterious corrosion such as rust.

In-feed table 1006 is adjusted along guideways 1030 and 1032 to select the desired depth of cut by manipulation of table adjusting screw 1040.

Table adjusting screw 1040 has a reduced diameter portion 1042 received within the upwardly opening slot 1044 of an upwardly extending ear 1046 cast integral with the member 1000 at the lower end of the wall 1034. A suitable adjustment handle or knob 1048 is fixed to the end of screw 1040 by a set screw 1050 seated in portion 1042. The screw 1040 is rotatably mounted upon and axially confined relative to the ear 1046 of member 1000 by a pair of washers 1052 and 1054 which embrace the portion of ear 1046 at the opposite sides of slot 1044 and a spring clip 1056 which engages the annular groove 1058 in the shank of screw 1040 or a retainer collar brazed to screw 1040. The threaded portion 1058 of screw 1040 is threadedly engaged with a nut 1060 which is axially and non-rotatably fixed to the in-feed table 1006 as will be explained presently. By this construction, rotary manipulation of the screw 1040 in opposite directions by the handle 1048 is effective to shift the in-feed table 1006 up and down the guideways 1030 and 1032 to thereby shift the level of the top planar surface of in-feed table 1006 relative to the parallel top surface of the out-feed table 1004 and the cutting circle of the cutter head 1010 to thereby adjust the depth of cut.

Referring again to FIGURE 38, the in-feed table 1006 is resiliently retained against the guideways 1030 and 1032. For this purpose, a pair of screws 1062 and 1064 are threadedly engaged with aligned apertures in bosses 1063 and 1065 respectively cast in the bottom of the in-feed table 1006. Screws 1062 and 1064 extend through apertures 1038 and 1036 respectively in wall 1034. The apertures 1036 and 1038 are sufficiently elongated longitudinally of the guideways 1030 and 1032 (as is apparent from FIGURE 43) that this connection does not inhibit any normal depth of cut adjustment of the in-feed table 1006 relative to the base casting 1000. Beneath wall 1034, the shanks of screws 1062 and 1064 extend through aligned apertures in a steel wear distribution bearing plate 1070, Belleville springs 1066 and 1068, washers 1067 and 1069 and lock washers 1071 (see also FIGURE 43). Springs 1066 and 1068 surrounding the shanks of screws 1062 and 1064 respectively resiliently bias plate 1070 against the under-surface of wall 1034 to resiliently bias in-feed table 1006 downwardly against the guideways 1030 and 1032.

As is apparent from FIGURE 38, the nut 1060 of the depth of cut adjustment lies between end walls 1072 and 1074 formed by a matingly shaped nut socket 1073 formed integrally in casting the in-feed table 1006 and extending normally to the direction of the movement of the in-feed table 1006 along the guideways 1030 and 1032. Walls 1072 and 1074 are suitably apertured to permit insertion therethrough of the screw 1040 in threaded engagement through the nut 1060.

Figure 44:
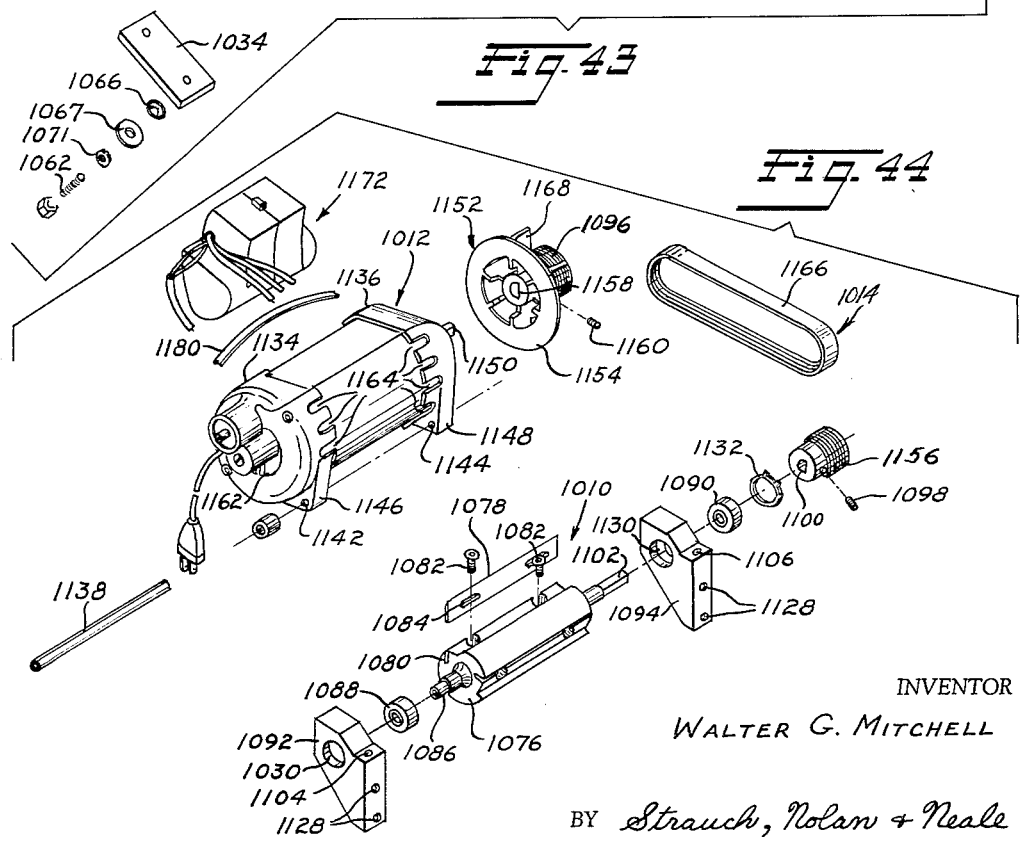

Referring now to FIGURE 44, the cutter head 1010 comprises a cutter head body 1076 having a plurality of equi-angularly spaced cutter blades 1078 secured in longitudinally extending slots 1080 in the cutter head body 1076 by screws 1082, the heads of which engage at one side elongated recesses 1084 in the interior of the cutter blades 1078. The screws 1082 firmly seat the blades 1078 into bottom of slots 1080 and the blades are secured in place in body 1076. The cutter head body 1076 is fixed to a coaxial shaft 1086 which is journaled by axially spaced ball type anti-friction bearings 1088 and 1090 mounted in pillowblocks 1092 and 1094. A multiple groove drive pulley 1096 is fixed for rotation to the end of shaft 1086 by a set screw 1098 and the engagement of its internal flat 1100 with the complementary external flat 1102 on the end of the shaft 1086.

The pillowblocks 1092 and 1094 have vertically opening threaded apertures 1104 and 1106 respectively. These pillowblocks 1092 and 1094, in assembly, are located so that their apertures 1104 and 1106 are located beneath and in coaxial alignment with the apertures 1108 and 1110 of the base casting 1000 (FIGURE 43). Pillowblocks 1092 and 1094 are supported in this position by jack screws 1112 and 1114 which extend through the apertures 1108 and 1110 and are threadedly engaged with the apertures 1104 and 1106 of pillowblocks 1092 and 1094 respectively (FIGURE 44). By rotary manipulation of screws 1112 and 1114, the opposite ends of the cutter head shaft 1086 can be vertically adjusted to establish parallel alignment of the axis of shaft 1086 with reference to the planar surface of the out-feed table 1004. When this adjustment has been made, the pillowblocks 1092 and 1094 are fixed relative to the base 1000 by four set screws 1116 (but one of which is shown in FIGURE 43) cooperating with lock washers 1118, washers 1120 and each extending through one of the vertically elongated aperture 1122 in the vertical walls 1124 and 1126 of the base casting 1000 into engagement with the threaded apertures 1128 in the pillowblocks 1092 and 1094.

The pillowblocks 1092 and 1094 are of identical construction having apertured end walls 1130 against the interior face of which the outer races of the bearings 1088 and 1090 abut, bearing 1090 being axially retained in pillowblock 1094 by a snap-in retainer ring 1132 having equiangularly disposed peripheral teeth which firmly engage the bore of pillowblock 1094 in which the bearing 1090 is seated.

Returning to FIGURE 44, the drive motor 1012 is of substantially identical form to that of the other embodiments of this invention previously described having high thermal conductivity end bells 1134 and 1136 pivotally mounted upon a shaft 1138 which projects through and is fixed in aligned apertures 1140 (see FIGURES 38 and 39) drilled in the opposite walls of the casting 1000. Shaft 1138 extends through the aligned apertures 1142 and 1144 in the integral bosses 1146 and 1148 of the end bells 1134 and 1136. The bearing connections between shaft 1138 and end bells 1134 and 1136 and between shaft 1138 and the casting 1000 provide a high thermal conductivity heat transfer path from motor 1012 to casting 1000 as a heat sink. The projecting end of rotor shaft 1150 of the motor 1012 mounts an integrally die cast aluminum member 1152 having a centrifugal fan portion 1154 and an integrally connected multiple groove pulley 1156. Member 1152 is formed with a through aperture 1158 of complementary noncircular form to the noncircular cross section of the end of shaft 1150 to be nonrotatably mounted thereon and is fixed in position axially of shaft 1150 by a set screw 1160.

As will be recalled from the previous description of the drill press embodiment of this invention, the motor 1012 embodies a fan structure (not shown in this embodiment) internally of each of the end bells 1134 and 1136. In this embodiment, air is drawn in axially through the apertures 1162 in end bell 1134 from the inlet grill openings 1166 formed through the side wall of the base casting 1000 (see FIGURE 43) and discharged radially through the apertures 1164 of end bell 1134 to the interior chamber of casting 1000. Due to the greater volumetric capacity of the fan blades 1168 of the centrifugal fan portion 1154 of the member 1152 fixed to the motor shaft 1150, cooling air is drawn axially along the outside of the motor 1012, radially inwardly through the apertures 1164 and then axially through the end openings 1162 in the end bell 1136 into the inlet of fan portion 1154 in a manner similar to that described above in connection with the drill press. The opposing action of the fan portion 1154 and the fan within end bell 1136 merely results in greater air scrubbing action and heat transfer to the air from the motor.

The multiple groove pulleys 1156 and 1096 are interconnected by a belt of the type known as a Poly-V belt, one form of which may be purchased from Raybestos-Manhattan Inc., 19 Townsend Street, Passaic, New Jersey. The Poly-V belt 1166 provides a highly efficient transmission, being much thinner than a conventional V-belt or a conventional multiple V-belt. It is internally reinforced with either wire or nylon cord, has strength equal to that of much thicker V-belts, and, being thinner requires much less absorption of energy in its bending about the pulleys. The ratio between pulleys 1156 and 1096 is such that with the motor 1012 rotating at 3,600 r.p.m., the cutter head 1010 will rotate approximately 4,100 r.p.m.

Referring now to FIGURE 39, the air discharged radially from the blade 1168 of the fan portion 1154 of the member 1152 (FIGURE 44) circulates about the Poly-V belt 1166 and is discharged through the openings in the grill 1170 in the casting 1000 at the rear of the table 1004 as is best shown in FIGURE 39.

As was explained in detail above, it is preferable that the axis of shaft 1138 be located between the plane defined by the axis of the motor 1012 and the axis of the cutter head 1010 and a second plane containing the outer face of the power transmitting or tension run of belt 1166. When so located, proper belt tension is assured. In this embodiment it has been found, however, that reasonably satisfactory results can also be obtained if the axis of shaft 1138 is located below the tension run of belt 1166.

As is best shown by reference to FIGURES 38 and 44, the starting capacitor unit 1172 for the motor 1012 is not directly attached to the motor 1012 but is inserted upwardly within the interior of the casting 1090 to seat against the internal top wall 1174, the partition 1176 and the internal face of the external wall 1178 and is retained in that position by a bow-shaped retainer spring 1180 toothed at its opposite ends as is best shown in FIGURE 44 to grippingly engage the internal opposed end walls of the compartment in which it is placed. By this construction, it is merely necessary to push the capacitor unit 1172 upwardly into the casting 1000 to the position shown in FIGURE 38, and thereafter push the retainer 1180 into position. No further assembly procedure is required.

Referring again to FIGURE 38, the table 1006 is a unitary die casting of aluminum or aluminum alloy. It has a planar top surface 1182, a series of transverse reinforced ribs or walls 1184, 1186, and 1074 projecting from its bottom in planes normal to the path of motion of the in-feed table 1006 relative to the base casting 1000 along the guideways 1030 and 1032. These partitions 1184, 1186 and 1074 are interconnected by longitudinally extending reinforcing ribs or webs formed integral with the table 1006.

As is best shown in FIGURE 41 in reference to web 1074, the bottom edges of these webs are formed with inverted truncated V notches 1188 and 1190 aligned with and embracing the complementary surfaces of the guideways 1030 and 1032.

Referring to FIGURE 39 the inner edge 1192 of the rabbeting arm 1026 is formed with a notch 1194 having a surface 1196 lying parallel to the path of movement of the in-feed table 1006 relative to the base casting 1000 and formed with graduations 1198 cooperating with the pointer 1200 fixed to the side wall of the casting 1000 by a screw 1202 as is best shown in FIGURE 43. Pointer 1200 and scale 1198 cooperate to form a depth of cut indicator which is readily visible by the operator from above. This is one important aspect of the jointer embodiment of this invention in that for the first time insofar as applicant is aware it permits the operator to make his depth of cut adjustments in a jointer without stooping down to view the depth of cut gauge beneath the plane of the in-feed and out-feed tables.

The disclosed jointer, like the drill press and circular saw, by reason of utilization of the small size casingless motor and designing of the housing and operating parts in accord with this invention, provides a tool delivering a power output equivalent to present day commercial home workshop jointers and provides a four inch width of cut, a one-quarter inch depth of cut, a rabbeting capacity of one quarter inch by four inches, a nineteen and one-half inch table length, an overall length of twenty-two and twenty-one thirty-seconds inches, an overall width of nine and three-quarters inches and an overall height of seven and seven thirty-seconds inches. These work capacities are comparable to present day competitive jointers and the jointer is sufficiently light in weight and dimensioned to also be unit packaged for over-the-counter department store selling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A drill press head assembly comprising a two-part housing formed by two complementary shell-like castings adapted to be secured together along a common plane; complementary longitudinally extending recesses extending along and adjacent to opposite longitudinal edges of each casting; complementary recesses formed in each casting between said longitudinally extending recesses whereby longitudinal bores are formed within said housing adjacent and along opposite sides thereof and an intermediate recess is formed between said bores within said housing when said shell-like castings are joined together along said common plane; a support column received within one of said bores; a quill reciprocably received in the other of said bores; and a drive motor received in said intermediate recesses.

2. In a drill press head assembly, a combined motor and operating mechanism housing comprising light weight, high heat conductive die cast metal housing halves opposingly dished to provide (a) longitudinally spaced and aligned driven shaft and quill and spindle assembly bearing cavities along one longitudinal edge, (b) longitudinally spaced support column clamp cavities along the opposing longitudinal edge, (c) longitudinally extending motor housing cavities between said edge cavities, (d) open ended, peripherally flanged, pulley housing cavities at one end encircling said driven shaft bearing cavity forming walls and intersecting the respective adjacent end of said motor housing cavities and having (a) respectively aligned cross passages disposed adjacent said other end and said quill and spindle assembly bearing cavity forming support sockets for a quill feed mechanism, (b) having respective pairs of axially aligned bolt openings adjacent the respective inner edges of said driven shaft bearing cavity and the respective support column clamp cavities for receiving assembly bolts to secure said housing halves in assembled relation and (c) having additional pairs of axially aligned bolt openings adjacent the respective outer edges of said driven shaft bearing cavity, the respective support column clamp cavities and said quill and spindle assembly bearing cavities for receiving respective clamp bolts; respective bolt and nut assemblies disposed in said respective pairs of bolt openings; a quill and spindle assembly slidably supported in said quill and spindle assembly bearing cavities with feed rack teeth extending longitudinally along a face of the quill; a shaft journalled for rotation in bearings supported in said driven shaft bearing cavities with an end disposed in said pulley housing cavities and slidably drivingly coupled to the spindle of said quill and spindle assembly; a quill feed mechanism journalled in said cross passages having a shaft assembly including (a) a feed pinion fixedly disposed therealong in position to drivingly engage said feed rack teeth in one axial position of said shaft assembly, (b) a return spring assembly fixedly connected at one end to said shaft assembly and at its other end to a fixed housing part and (c) an operating member fixed to the other end of said shaft assembly which extends beyond the outer face of said other housing half; a motor assembly supported on one of said housing halves including a motor shaft extending into said pulley housing cavities; respective belt pulleys fixed to the respective ends of said motor shaft and driven shaft; and a driving belt drivingly encircling said belt pulleys.

3. The drill press head assembly of claim 2 wherein the throat dimension when used as a bench drill is of the order of present day commercial eleven inch drill presses.

4. The drill press head assembly defined in claim 2 wherein said quill comprises a sleeve-like die cast member formed (a) with an axial through bore dimensioned to freely pass said spindle and terminating at its opposite ends with sleeve bearing seat sockets comprising respective enlarged annular bearing engaging wall sections and respective adjacently related axially directed bearing chamber wall sections of still greater diameter terminating at the respective outer ends of said sleeve-like die cast member in annular end opening bearing flange seats of still greater diameter, (b) at one end with an annular radially outwardly directed flange adjacently disposed axially outwardly of an annular peripheral body ring groove of generally arcuate configuration in cross section, (c) with respective radial through wall openings located adjacent its opposite ends to respectively intersect said through bore in respective related poitions to form oiling passages into said bearing chamber wall section.

5. The drill press head assembly of claim 2 wherein the clamp bolt and nut assembly extending through the uppermost clamp bolt opening at said opposing longitudinal edge comprises a relatively long bolt shank adapting said shank to receive cylindrical spacer sleeves at opposite outer side faces of said housing halves and a cover member of dished shape contoured to matingly cooperate with said flanged pulley compartment and having depending spaced ears apertured to freely receive and spaced to engage the peripheral spacer sleeve walls in hingedly journalled relation on said spacer sleeves to provide access to said pulley compartment.

6. The drill press head assembly of claim 5 wherein the ends of said housing halves remote from said pulley compartment are provided with air passages communicating the interior of said head assembly with the ambient air, the cover member is provided with generally tangentially directed air passages communicating the interior of said cover with the ambient air and said motor drivingly mounts fan means for creating a forced flow of cooling air through said combined motor and operating mechanism housing in quantities sufficient to dissipate the operational heat and permit the use of sleeve bearings for mounting said driven shaft and said spindle.

7. A power drill press assembly of minimal overall dimensions adapted for handling workpieces commonly encountered in conventional home or cabinet workshops and conserving floor and storage space, said drill press assembly comprising a motor mount of high heat conductive material including an elongated motor and operating mechanism housing providing motor pivot ears and forming a radiating surface of large area and high thermal conductivity exposed to a heat absorption medium; a motor means pivotally connected to said motor pivot ears; tool means drive connected to said motor means and adapted to operate on a workpiece, said motor means comprising an electric motor having a stator of small diameter, a rotor and rotor shaft coaxially disposed within said stator with the shaft ends extending beyond said stator end faces and carrying at least one air propulsion fan means, at least one end bell of high heat conductive material fixed in butted relation to said stator and having heat conductive mounting means for mechanical and thermal connection to said motor mount, said end bell having (a) bearing supporting means supporting said rotor, (b) respective axially and radially directed sets of air circulation passages operatively related to said air propulsion fan means and each opening into a chamber space delimited by said end bell, and (c) baffle means to channel air from the ambient atmosphere into one set of said air circulation passages, through said one end bell, across the related stator face and outwardly from said end bell through the other of said sets of air circulation passages, said high heat conductive motor mount cooperating with said one end bell and said circulated air to extract heat generated in operation of said electric motor from said motor and effect a rapid dissipation of said heat, said housing substantially completely peripherally enclosing said motor means and most of said tool means and having air passages located at the longitudinal extremities providing inlets from ambient air at one end of said housing and outlets to the ambient air at the other end of said housing, said tool means comprising a retractable quill and spindle assembly operable through said one end of said housing and disposed adjacent to the motor pivot, shaft bearing seats and bearings journalling the spindle of said quill and spindle assembly, pulley and belt drive means connecting said rotor shaft and spindle and including an air propulsion fan of high capacity forming a part of said propulsion fan means; a further end bell, said one and further end bells being made of die cast aluminum and supporting said rotor shaft through seat enclosed bearings to conduct heat from said stator ends whereby cooling air under influence of said air propulsion fan is forcefully drawn into said housing through said air inlets at one end, impelled successively into and through said motor end bells in wiping contact to said rotor shaft bearing seats, said end bells and said rotor bearings and is impelled axially through said housing in wiping contact therewith and with said tool means and said stator and discharged from said housing through said outlets to extract the operational heat from said tool means as well as said motor parts and dissipate it into the ambient air, and a hinged dome shaped cover disposed at said other end of said housing and being provided in a peripheral wall portion with discharge ports inclined with respect to the discharge flow path of air to dissipate its discharge force.

8. In a power bench tool having a power tool housing, tool means supported by said housing, said housing being formed with internal wall surfaces defining a tool mounting and motor drive cavity, bearing means supported by said housing within said cavity and rotatably mounting said tool means surface means for supporting work to be engaged by said tool means, a motor disposed within said cavity and having a rotor shaft rotatable about an axis extending parallel to but laterally offset from the rotational axis of said tool means, and means drive connecting said shaft to said tool means, said motor further comprising a rotor mounted on said shaft, a stator coaxially surrounding said rotor, a pair of end bells formed separately of said housing and mounted on said shaft adjacent opposite ends of said stator, and heat conductive mounting means extending laterally from said end bells and supporting said end bells from said housing, said stator being supported by said end bells in spaced relation to the internal surfaces of said housing to delimit therewith an air flow channel, each of said end bells having separate spaced apart, axially and radially directed sets of air circulation openings respectively disposed adjacent said shaft and said stator, and means including air propulsion means for inducing air flow in a continuous stream passing seriately through at least one opening formed in said housing near one end of said motor, through said axially directed sets of openings in one of said end bells and into the interior of said one of said end bells, radially across the related end faces of said rotor and stator, out through said radially directed set of openings in said one of said end bells to the exterior of said motor, axially through said flow channel in wiping contact with said internal surfaces and the external periphery of said stator, through the radially directed set of openings in the other of said end bells and into the interior of said other of said end bells, radially across the related end faces of said rotor and said stator, out through said axially directed set of openings in said other of said end bells, and out of said cavity through at least a further opening in said housing disposed at the other end of said motor, said air propulsion means being effective to circulate a stream of air through said cavity in wiping contact with said mounting means and said bearing means.

9. The power bench tool defined in claim 8 wherein said air propulsion means comprises a fan mounted exteriorly of said end bells adjacent said further opening in said housing and means drive connecting said fan to said shaft.

10. The power bench tool defined in claim 8 wherein said housing is provided with a dome having a plurality of peripherally disposed openings through which air is discharged from said housing by said air propulsion means, said discharge openings being inclined with respect to the discharge flow path of air to dissipate its discharge force.

11. The power bench tool defined in claim 8 wherein said air propulsion means comprises a first fan disposed in said one end bell and a second fan disposed exteriorly of said end bells at the end of said stator opposite from said one end bell.

12. The power bench tool defined in claim 8 wherein said tool means comprises a drill press quill and spindle assembly.

13. The power bench tool defined in claim 12 wherein said means drive connecting said shaft to said tool means comprises respective pulley wheel means operatively connected to said rotor shaft and the spindle of said quill and spindle assembly, a drive belt trained around said pulley wheel means, and pivot means connecting said motor to said housing so that said motor and said rotor shaft are free to swing around the axis of said pivot means, the axes of said rotor shaft, said pivot means, and said spindle being mutually parallel, the axis of said pivot means being located to one side of a first plane containing the axes of said rotor shaft and said spindle within an area delimited by a plane containing the outermost face of the drive run of said drive belt.

References Cited by the Examiner

UNITED STATES PATENTS

| | | | |
|---|---|---|---|
| 1,434,564 | 11/1922 | Ruetschi | 77—5 |
| 1,830,679 | 11/1931 | Schenck | 77—5 |
| 1,852,736 | 4/1932 | Connell | 77—6 |
| 1,868,533 | 7/1932 | Johnson | 74—242.15 X |
| 1,892,997 | 1/1933 | Oldenburg | 77—6 |
| 1,977,061 | 10/1934 | Hey | 77—6 |
| 1,990,035 | 2/1935 | Kratz et al. | 77—6 |
| 2,006,746 | 7/1935 | Poole | 77—33.1 |
| 2,155,082 | 4/1939 | Decker | 77—6 |
| 2,265,408 | 12/1941 | Tautz | 143—36 |
| 2,281,218 | 4/1942 | Windsor | 77—6 |
| 2,292,872 | 8/1942 | Eastman | 143—36 |
| 2,430,798 | 11/1947 | Alexander | 74—242.15 |
| 2,758,617 | 8/1956 | Taylor | 144—253.7 |
| 2,763,802 | 9/1956 | Dolan | 310—50 X |
| 2,771,797 | 11/1956 | Benbow | 77—6 |
| 2,825,827 | 4/1958 | Luenberger | 310—60 |
| 2,872,957 | 2/1959 | Eschenburg | 144—253.7 |
| 2,913,934 | 11/1959 | Quackenbush | 77—33.1 |
| 2,965,774 | 12/1960 | Rangus | 310—50 |

WILLIAM W. DYER, Jr., *Primary Examiner.*

FRANK H. BRONAUGH, J. SPENCER OVERHOLSER, ANDREW R. JUHASZ, *Examiners.*